(12) United States Patent
Sato et al.

(10) Patent No.: US 6,731,301 B2
(45) Date of Patent: May 4, 2004

(54) SYSTEM, METHOD AND PROGRAM FOR COMPUTER GRAPHICS RENDERING

(75) Inventors: Hidehiko Sato, Tokyo (JP); Takashi Takemoto, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 331 days.

(21) Appl. No.: 09/816,394

(22) Filed: Mar. 26, 2001

(65) Prior Publication Data

US 2001/0030650 A1 Oct. 18, 2001

(30) Foreign Application Priority Data

Mar. 28, 2000 (JP) .......................................... 2000-087922

(51) Int. Cl.$^7$ ............................................... G06T 15/00
(52) U.S. Cl. ...................... 345/613; 345/694; 345/611
(58) Field of Search ................................ 345/694, 611, 345/613

(56) References Cited

U.S. PATENT DOCUMENTS 6,476,807 B1 * 11/2002 Duluk et al. ................. 345/421

OTHER PUBLICATIONS

Mark Segal, et al., "The Open GL Graphics System: A Specification (Version 1.2)", Dithering, Mar. 23, 1998, Chapter 4, pp. 149–150.

* cited by examiner

Primary Examiner—Michael Razavi
Assistant Examiner—Motilewa Good-Johnson
(74) Attorney, Agent, or Firm—Oblon, Spivak, McClelland, Maier & Neustadt, P.C.

(57) ABSTRACT

The present invention is related to a computer graphics rendering system, method and program product for drawing a plurality of pixels in parallel. A computer graphics rendering system for drawing a plurality of pixels in parallel in accordance with the present invention comprises a set-up unit 3 for calculating parameters of an apex of a polygon and the gradient values of the parameters inside of said polygon; a DDAX 111 for calculating the relative position of a representative point of each stamp in relation to said apex of said polygon; a DDA color unit 112 for calculating the parameters of said representative point on the basis of the parameters of said apex of said polygon, the gradient values of the parameters inside of said polygon and the relative position of said representative point; an SRAM module 115 for storing a sampling pattern which is a combination of the relative position(s) of one or more sample point(s) in relation to said representative point; and a multiply arithmetic circuit 113 for calculating the parameters of said one or more sample point(s) on the basis of the parameters of said representative point, the gradient values of said parameters and the relative positions of said sample points.

15 Claims, 33 Drawing Sheets

FILTERING

SYSTEM, METHOD AND PROGRAM FOR COMPUTER GRAPHICS RENDERING

CROSS-REFERENCE TO RELATED APPLICATIONS

This application is based upon and claims the benefit of priority from the prior Japanese Patent Application No. 2000-87922, filed Mar. 28, 2000; the entire contents of which are incorporated herein by reference.

BACKGROUND OF THE INVENTION

1. Field of the Invention

The present invention is related generally to a computer graphics rendering system, method and program product for drawing a plurality of pixels in parallel.

2. Description of the Related Art

In the case where the display resolution is fixed, it is usual and inevitable to make use of the antialiasing technique, which is effective to minimize jaggies, in order to improve the quality of images. Super sampling is a technique for implementing the antialiasing technique.

In accordance with the super sampling technique, an object is drawn by a hardware at a resolution higher than the resolution of the display device followed by sampling appropriate pixels from the hardware drawn image and filtering the samples in order to reduce the resolution.

For example, in the case of displaying images for a screen having 320×240 pixels by super sampling at twice resolutions in the vertical and horizontal directions, after 640×480 subpixels are drawn at first, one pixel is generated by passing through an average filter each four subpixels thereof as a set arranged in a 2×2 matrix as illustrated in FIG. 1, resulting in 320×240 pixels by repeating the filtering process for the respective blocks.

In other words, a number of subpixels are drawn on a main storage device such as a random access memory followed by reducing the resolution by means of a filter and displaying pixels on a display device such as a CRT.

However, in the case where the super sampling is performed at the resolution N times higher than the display resolution both in the horizontal direction and in the horizontal direction, there are problems that A) the memory space as required for drawing subpixels is N squared times the memory space for displaying final pixels and that B) the operation cost as required is N squared times the operation cost for displaying the same number of pixels.

Also, it is necessary to calculate a plurality of parameters for use in calculating R, G and B values and texture mapping and therefore to provide a number of multiply arithmetic circuits respectively for calculating these parameters, resulting in a larger hardware configuration as required.

SUMMARY OF THE INVENTION

In order to solve the shortcomings as described above, it is an object of the present invention to provide a high-quality and high-performance rendering system capable of super sampling only with a simple hardware configuration at a low cost.

In order to accomplish the above and other objects, a first aspect of the present invention resides in sampling pattern which is a combination of the relative position(s) of one or more sample point(s) in relation to the representative point; calculating parameters of an apex of a polygon and the gradient values of the parameters inside of the polygon; calculating the relative position of a representative point of a stamp in relation to the apex of the polygon; calculating the parameters of the representative point on the basis of the parameters of the apex of the polygon, the gradient values of the parameters inside of the polygon and the relative position of the representative point; and calculating the parameters of each sample point on the basis of the parameters of the representative point, the gradient values of the parameters and the relative positions of the each sample point.

The parameters include color information about the three primary colors of light (i.e., red, green and blue), the depth values (the Z values), the transparency values (A) and so forth.

The pixel is the irreducible element of an image which can be displayed by a display system. The values of parameters of a pixel are determined on the basis of the values of parameters of plurality of subpixels which are obtained by dividing the pixel. The sample points are subpixels which are used for determining the values of parameters of a pixel. The values of parameters of all the constituent subpixels are used for determining the values of parameters of a pixel in some cases while the values of parameters of only part of the constituent subpixels are used for determining the values of parameters of a pixel in other cases. In the case where the values of parameters of all the constituent subpixels are used for determining the values of parameters of a pixel, the sample points and the subpixels are equivalent to each other. However, in the case where the values of parameters of only part of the constituent subpixels are used for determining the values of parameters of a pixel, the sample points are particular ones of the constituent subpixels.

The sampling pattern contains the information about what subpixels are used for determining the values of parameters of a pixel. In other words, the sampling pattern is indicative of whether the values of parameters of all or part of the constituent subpixels are used, and indicative of what subpixels are used in the case where the values of parameters of only part of the constituent subpixels are used. More specifically speaking, the sampling pattern is a combination of the information items indicative of the relative positions of the respective subpixels in relation to a representative subpixel (called the representative point).

The polygon is the surface of a closed plane figure bounded by line segments and, in many cases, the surface of a triangular polygon having three apices. The apices of a polygon are the apices of the closed plane figure.

A stamp is a set of subpixels which can be drawn in one cycle.

DETAILED DESCRIPTION OF THE PREFERRED EMBODIMENTS

In the following description, several preferred embodiments in accordance with the present invention will be explained in conjunction with the accompanied drawings. First, the technical matters common to the respective embodiments of the present invention will be explained.

The term "rendering" refers generally to the technique of converting the coordinates of modeling data to the corresponding coordinates in a view-coordinate system, handling hidden surfaces, shading the surfaces of objects and then generating graphical images to be displayed. In the case of a parallel rendering system which performs rendering of images in a parallel fashion, one M×N square subpixel matrix is drawn at a time.

Figure 23:
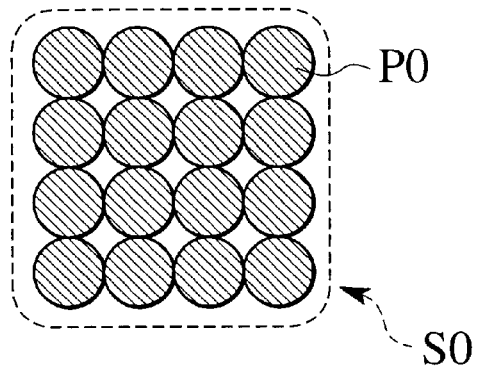
FIG. 23 is a schematic diagram showing a stamp consisting of four subpixels in the lateral direction and four subpixels in the vertical direction.

For example, in the case of a 4×4 subpixel matrix which total to 16 subpixels as illustrated in FIG. 23, the 16 subpixels P0 are drawn in one cycle as one stamp S0. The term "stamp" stands for a subpixel matrix which can be drawn in one cycle. The term "4×4 subpixels" stands for four subpixels in the lateral direction×four subpixels in the vertical direction totaling to 16 subpixels.

Figure 24:
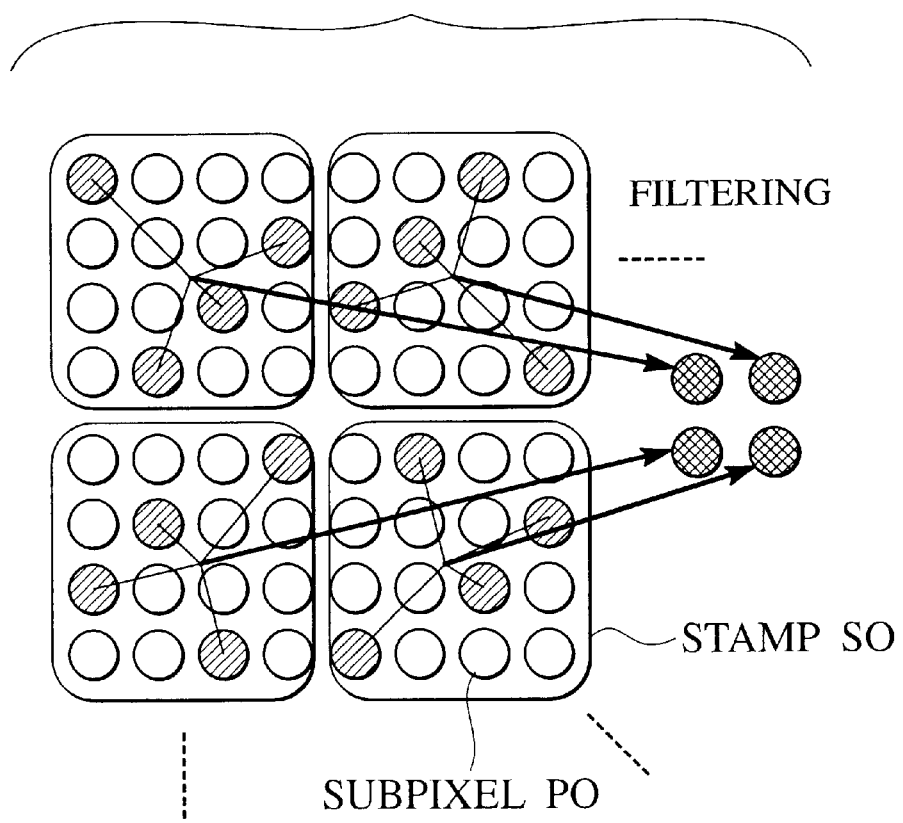
FIG. 24 is a schematic diagram showing the relationship between four subpixels selected from one stamp (including four subpixels in the lateral direction×four subpixels in the vertical direction totaling to 16 subpixels) and one pixel obtained by sampling and filtering the predetermined four subpixels as selected.

FIG. 24 is a schematic diagram showing an example of drawing one pixel by selecting, sampling and filtering predetermined four subpixels of the 16 subpixels. Namely, sampled and drawn are only a predetermined number a (a<16) of the subpixels, for example, four subpixels rather than all the pixels belonging to a stamp. Four subpixels are sampled from four points in an adjacent stamp in the same manner. One frame is drawn by repeating the similar process. The four subpixels as selected for each stamp are filtered in order to generate one pixel on a display device.

Although one stamp is divided into 16 subpixels, only four subpixels are actually drawn for one stamp so that the calculation tasks are equivalent to those in the case of the 2×2 super sampling. The technique of drawing only part (4/16) of the subpixels rather than drawing all the 16 subpixels is termed as "sparse sampling" in this description. The quality of images is improved by dividing one stamp into 16 subpixels and selecting four subpixels from thereamong for filtering in order to display one pixel as compared with the case of simply dividing one stamp into four subpixels and filtering the four subpixels in order to display one pixel.

Figure 1:
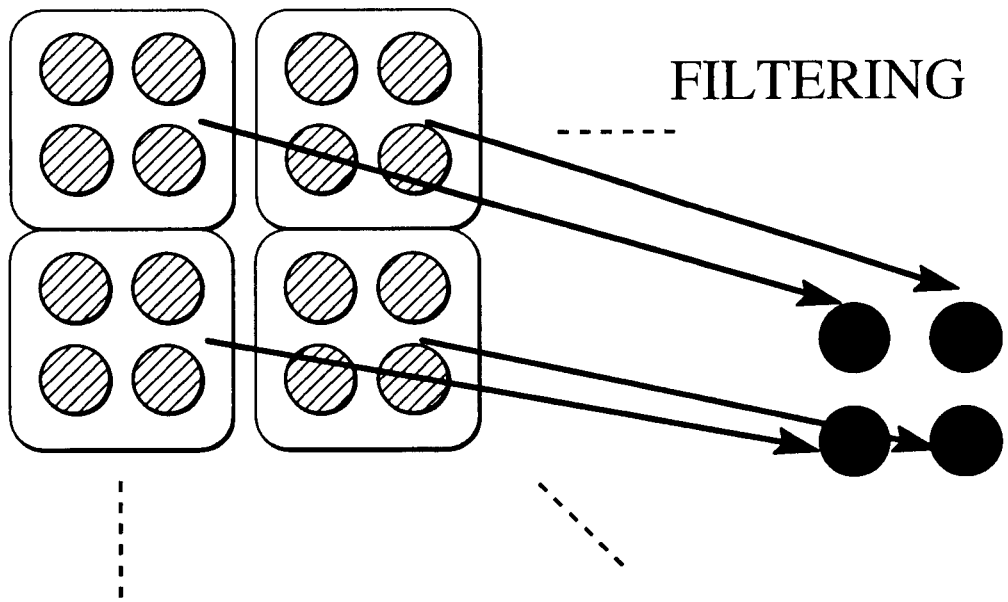
FIG. 1 is a schematic diagram demonstrating an exemplary prior art technique of obtaining one pixel by filtering four subpixels.
Figure 2:
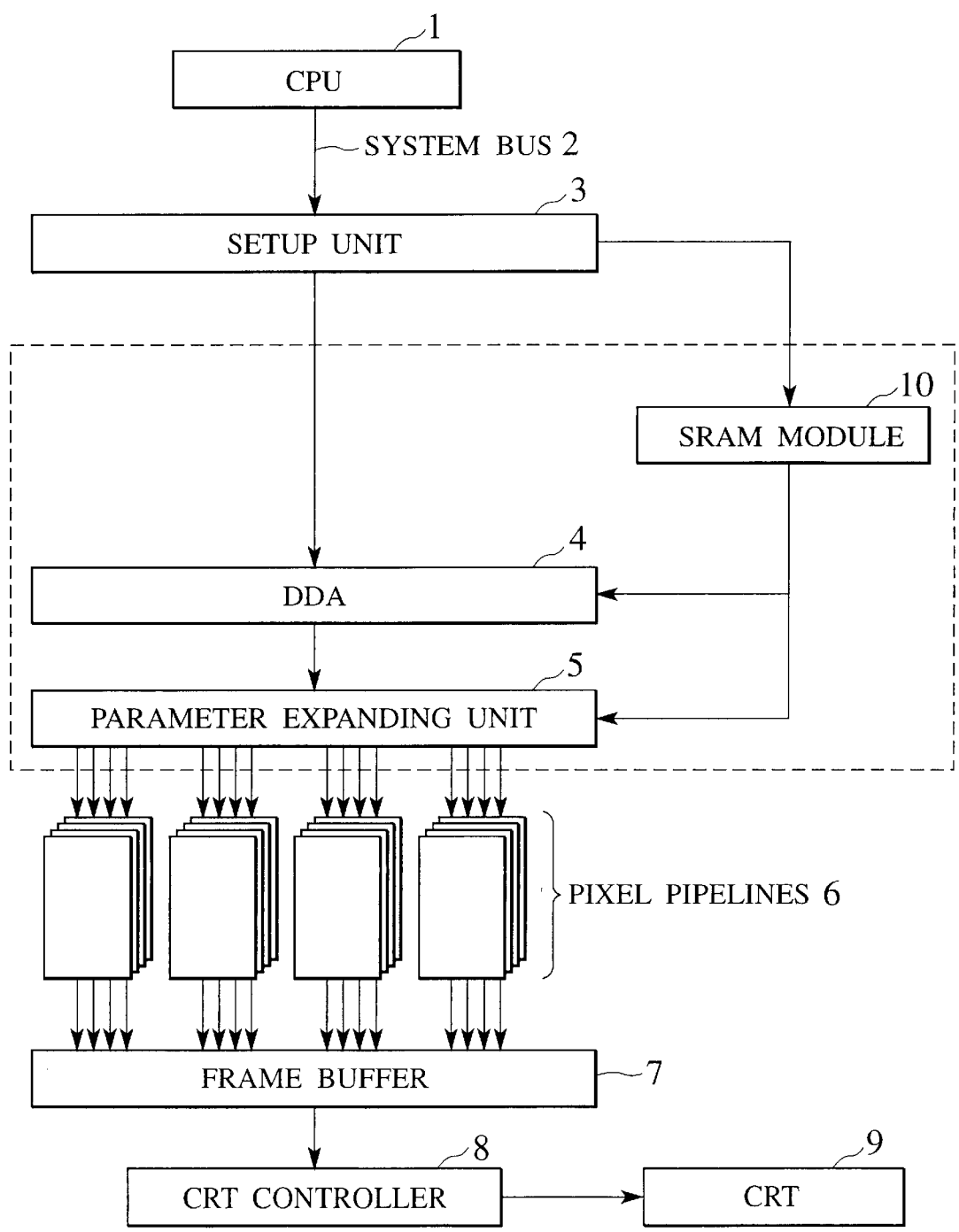
FIG. 2 shows the overall configuration of the rendering system common to the respective embodiments in accordance with the present invention.

FIG. 2 shows the overall configuration of the rendering system common to the respective embodiments in accordance with the present invention. The rendering system is composed of a CPU 1, a system bus 2, a set-up unit 3, a DDA 4 and a parameter expanding unit 5. The rendering system in accordance with the present invention is provided with a parallel rendering function for processing a plurality of pixels in one cycle at the same time.

In accordance with a three-dimensional graphics imaging technique, an object defined by three-dimensional coordinate data is projected to a two-dimensional space in order to display the projected image. The so-called "polygons" are used for modeling a three-dimensional object. When a polygon is projected onto a two-dimensional space, the apex information of the polygon is used to generate pixels inside of the polygon on the basis of the linear interpolation technique called DDA (Digital Differential Analysis).

In accordance with the DDA technique, the gradient values of data on the sides are calculated with reference to the apex information and used to calculate data on the sides. The gradient values on the scanning lines (in the x-direction) are then calculated and used to generate pixels inside of the polygon.

The CPU 1 is connected to the set-up unit 3 through the system bus 2. The set-up unit 3 is connected to the DDA 4 and an SRAM module 10. The DDA 4 is connected to the parameter expanding unit 5; the parameter expanding unit 5 to pixel pipelines 6; the pixel pipelines 6 to a frame buffer 7; the frame buffer 7 to a CRT controller 8; and the CRT controller 8 to the CRT 9 respectively. The SRAM module 10 is connected to the DDA 4 and the parameter expanding unit 5.

The CPU 1 serves to generate the apex information of the polygons by geometry processes, lighting processes and so forth.

The system bus 2 is used for effectively transferring the apex information from the CPU 1 to the set-up unit 3.

The set-up unit 3 serves to calculate the gradient values of the linear equations corresponding to the boundary lines of the polygons The DDA 4 serves to calculate the relative position, the color information and the depth value of the representative point of each stamp with reference to the gradient values of the linear equations as obtained by the set-up unit 3. The representative point of a stamp is a particular pixel in the stamp of which the color information and the like is obtained by the use of accurate gradient values. In the case of a parallel rendering system, a representative point is selected among from subpixels which are drawn at the same time. The DDA 4 serves to calculate several parameters, i.e., the depth value (the Z values), the transparency value (A) and the like of the representative point in addition to the color information (R, G and B).

For example, the color information R of a representative point is calculated in accordance with the following equation, $$R = R0 + dR/dx \cdot \Delta X + dR/dy \cdot \Delta Y$$

where
- R0: red value of an apex
- dR/dx red gradient value in the x-direction
- dR/dy: red gradient value in the y-direction
- $\Delta X$: x-coordinate of the representative point relative to the apex
- $\Delta Y$: y-coordinate of the representative point relative to the apex.

The parameter expanding unit 5 serves to perform parallel image processing for calculating the respective parameters of the sample points other than the representative point by the use of the parameters of the representative point and less accurate gradient value information, and allocate the results as obtained to the pixel pipelines 6. The less accurate gradient value information is the accurate gradient values information which is used to calculate the respective parameters of the representative point by the set-up unit 3 but whose fractions are round down.

The pixel pipelines 6 serves to perform graphics imaging such as hidden-surface removal, texturing processes and so forth on the basis of information required for drawing the respective pixels as allocated by the parameter expanding unit 5.

The frame buffer 7 is used to transfer the respective pixel data to a graphics memory after the graphics imaging which is not shown in the figure. The graphics memory has a memory capacity sufficient for storing data of one or a plurality of frames including the depth values (the Z values) for Z buffering in addition to the color information of the respective pixels.

The CRT controller 8 serves to generate the signals for displaying the respective pixels on a display device such as a CRT (a cathode ray tube). The CRT controller 8 serves to display images by transferring the respective pixel data to the CRT 9 and the like together with the synchronization signals. A television, a liquid crystal display and the like can be used in place of the CRT 9. The SRAM module 10 receives and stores a sampling pattern from the CPU 1.

Figure 3:
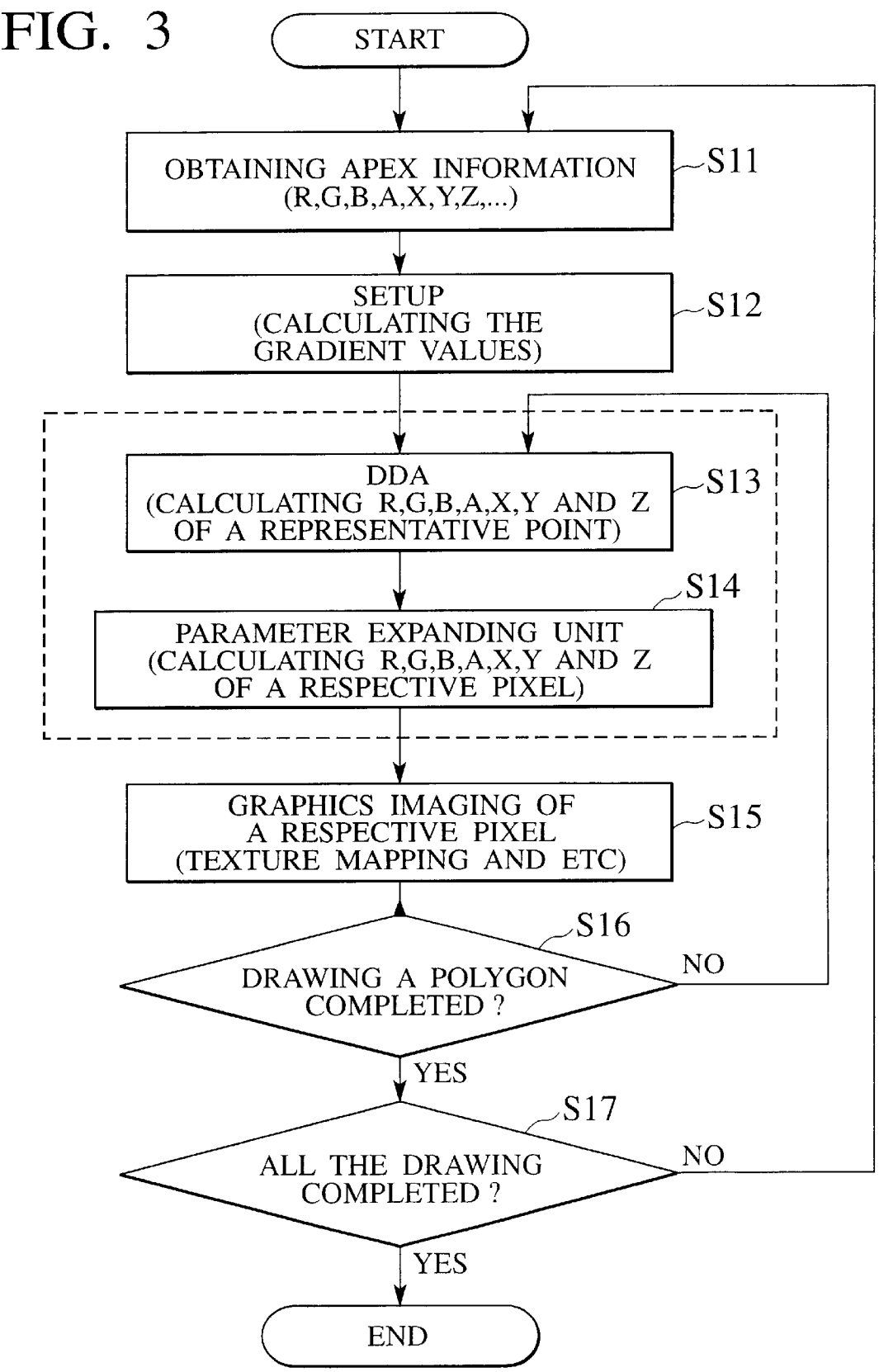
FIG. 3 is a flowchart showing the outline of the procedure common to the respective embodiments in accordance with the present invention.

Next, with reference to FIG. 3, the procedures common to the respective embodiments of the present invention will be explained.

The apex information about R, G, B, A, X, Y, Z and the like is obtained in the step S11 followed by calculating the gradient values of the respective parameters by the use of the set-up unit 3 in the step S12. The equations used for obtaining the respective parameters will be explained in the following description.

R, G, B, A, X, Y and Z of a representative point are calculated by means of the DDA 4 in the step S13 followed by calculating R, G, B, A, X, Y and Z of the respective pixels in the step S14 by means of the parameter expanding unit 5.

The pixel pipelines 6 then perform graphics imaging of the individual pixels such as texture mapping in the step S15.

It is judged whether or not drawing of a polygon has been completed in the step S16. If not completed, the procedure is returned to the step S13 after the judgment.

If completed, it is judged whether or not all the drawing as required has been completed in the step S17. If all the drawing has not been completed yet while drawing of a polygon has been completed, the procedure is returned to the step S11 after the judgment.

When drawing of the polygons has been completed and all the drawing has been completed, the procedure is terminated.

Figure 4:
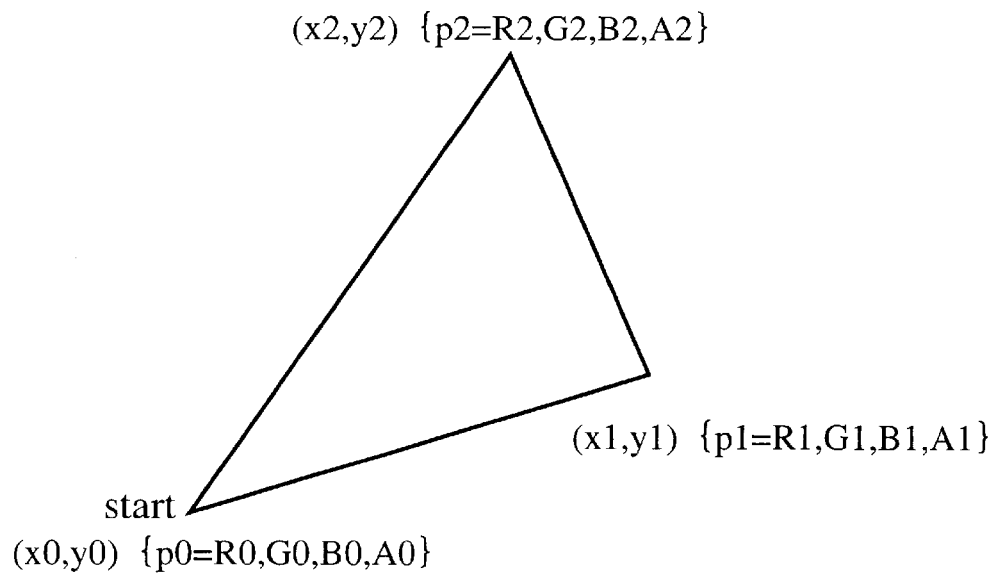
FIG. 4 is a schematic diagram showing the equations for calculating the gradient values of the respective parameters by the set-up unit 3 as illustrated in FIG. 1.

FIG. 4 is a schematic diagram showing the equations for calculating the gradient values of the respective parameters by the set-up unit 3.

If the start point is (x0, y0), the gradient values of a respective parameter P in the x-direction and the y-direction are calculated as $$dp/dx = \{(p1-p0) \times (y2-y0) - (p2-p0) \times (y1-y0)\}/e0$$

$$dp/dy = \{(p2-p0) \times (x1-x0) - (p1-p0) \times (x2-x0)\}/e0$$

where $e0 = (x1-x0) \times (y2-y0) - (x2-x0) \times (y1-y0)$.

<Embodiment 1(a)>

Figure 5:
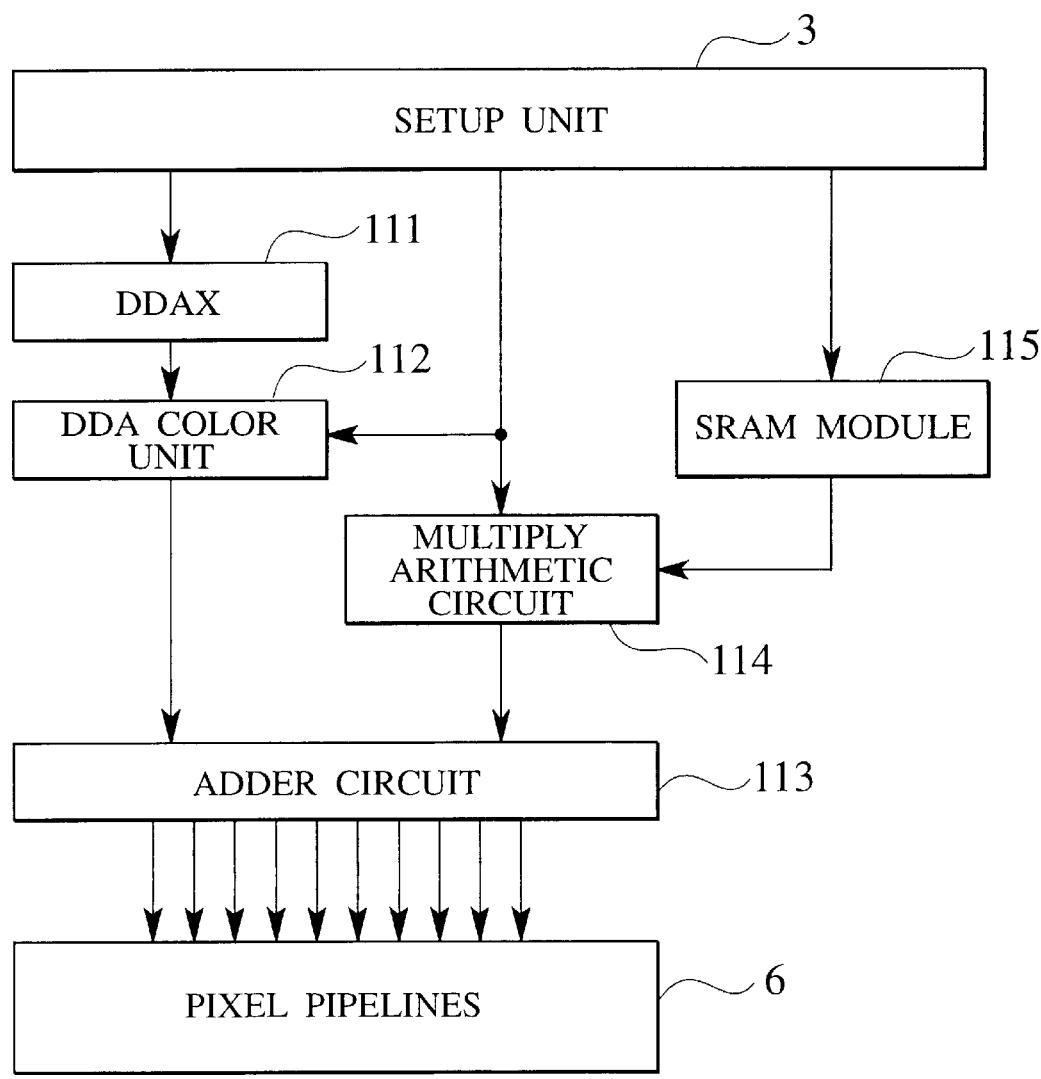
FIG. 5 is a block diagram showing the configuration from the set-up unit 3 to the pixel pipelines 6 in accordance with the embodiment 1(a).
Figure 6:
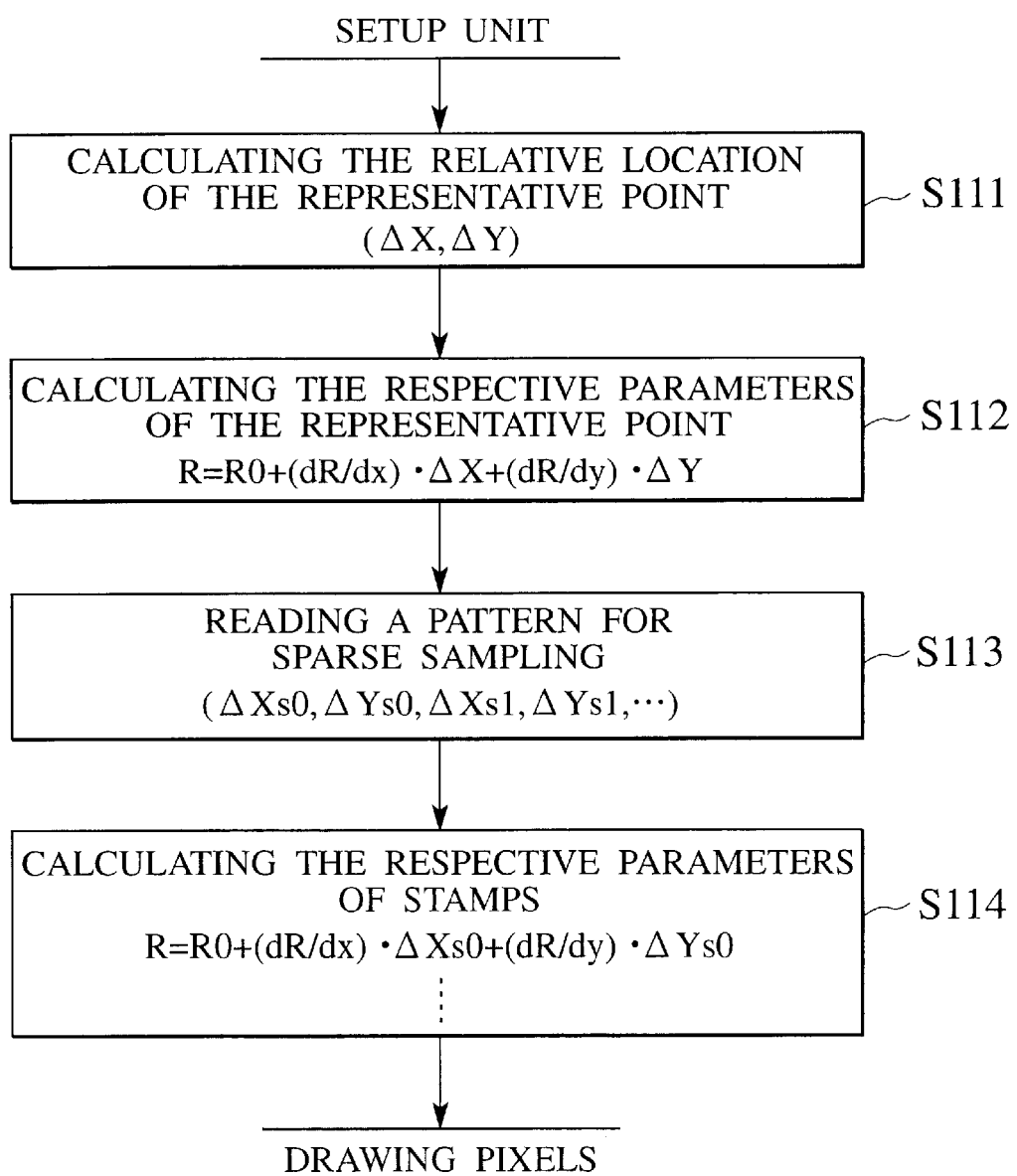
FIG. 6 is a flowchart showing the procedure from the set-up unit 3 to the pixel pipelines 6 in accordance with the embodiment 1(a).

FIG. 5 is a block diagram showing the configuration from the set-up unit 3 to the pixel pipelines 6 in accordance with the embodiment 1(a). FIG. 6 is a flowchart showing the procedure for the respective blocks as illustrated in FIG. 5.

The set-up unit 3 functions as a polygon parameter calculating unit; a DDAX 111 as a representative point position calculating unit; a DDA color unit 112 as a representative point parameter calculating unit; an SRAM module 115 as a sampling pattern storing unit; and a multiply arithmetic circuit 114 and the adder circuit 113 as a sample point parameter calculating unit.

The relative position of the representative point of a stamp relative to the polygon drawing starting point is calculated by the DDAX 111 in order to obtain the coordinates (ΔX, ΔY) of the representative point of the stamp in relation to the polygon drawing starting point in the step S111. The polygon drawing starting point is one of the three apices of a triangle polygon.

The respective parameters of the representative point are calculated by means of the DDA color unit 112 in the step S112. For example, the red component of the representative point R is calculated by $$R = R0 + (dR/dx) \cdot \Delta X + (dR/dy) \cdot \Delta Y$$

where R0 is the red component of the polygon drawing starting point; (dR/dx) is the increment of the red component when x is incremented by 1; and (dR/dy) is the increment of the red component when y is incremented by 1.

Next, a pattern for sparse sampling is read out from the SRAM module 115 in the step S113.

The pattern for sparse sampling is such as indicating the relative positions of subpixels sampled among from a plurality of subpixels. For example, in the case where four subpixels are sampled among from 16 subpixels, the pattern for sparse sampling is indicative of the displacements ΔXs of the first, second, third and fourth sample points from the representative point in the x-direction and the displacement ΔYs of the first, second, third and fourth sample points from the representative point in the y-direction.

(dR/dx)·ΔXs and (dR/dy)·ΔYs are calculated by means of the multiply arithmetic circuit 114 followed by calculating (dR/dx)·ΔXs+(dR/dy)·−ΔYs by means of the adder circuit 113 in order to obtain the respective parameters of the respective sample points within the stamp.

Figure 25:
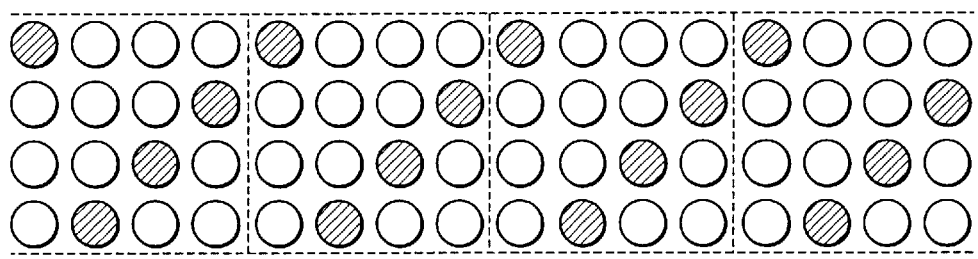
FIG. 25 is a schematic diagram showing four subpixels selected from one stamp (including four subpixels in the lateral direction×four subpixels in the vertical direction totaling to 16 subpixels) in accordance with the embodiment 1(a).

One example of the drawing plane as obtained is illustrated in FIG. 25. In the same figure, with the top left of each respective stamp as a representative point, the other three points are drawn on the basis thereof. In this case, the representative point is always located in the top left even if the stamp is located anywhere. Also, the pattern for sparse sampling is not variable.

The distance Δx between each adjacent subpixels in the x-direction and the distance Δy between each adjacent subpixels in the in the y-direction are fixed respectively. Because of this, the distances of each subpixel from the representative point are integer multiples of Δx and Δy. It is possible to perform the multiplication of a fixed value by an integer by means of the addition/subtraction arithmetic circuits and therefore possible to implement the system in accordance with the present invention with a hardware configuration comparable to that in accordance with the prior art techniques. In addition to this, it is therefore possible to improve the quality of images as compared with a conventional hardware having an equivalent computation power.

<Embodiment 1(b)>

Figure 7:
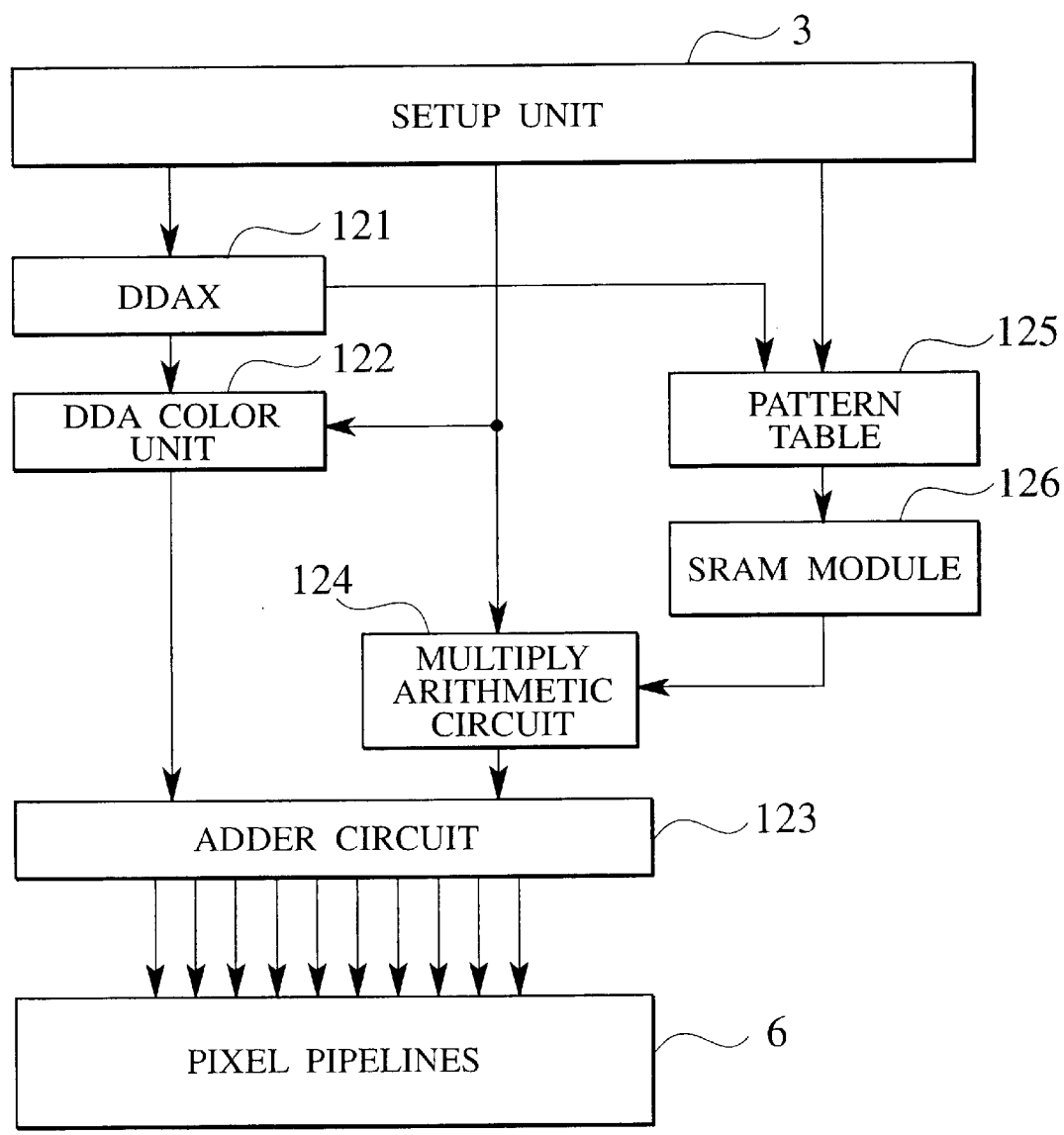
FIG. 7 is a block diagram showing the configuration from the set-up unit 3 to the pixel pipelines 6 in accordance with the embodiment 1(b).
Figure 8:
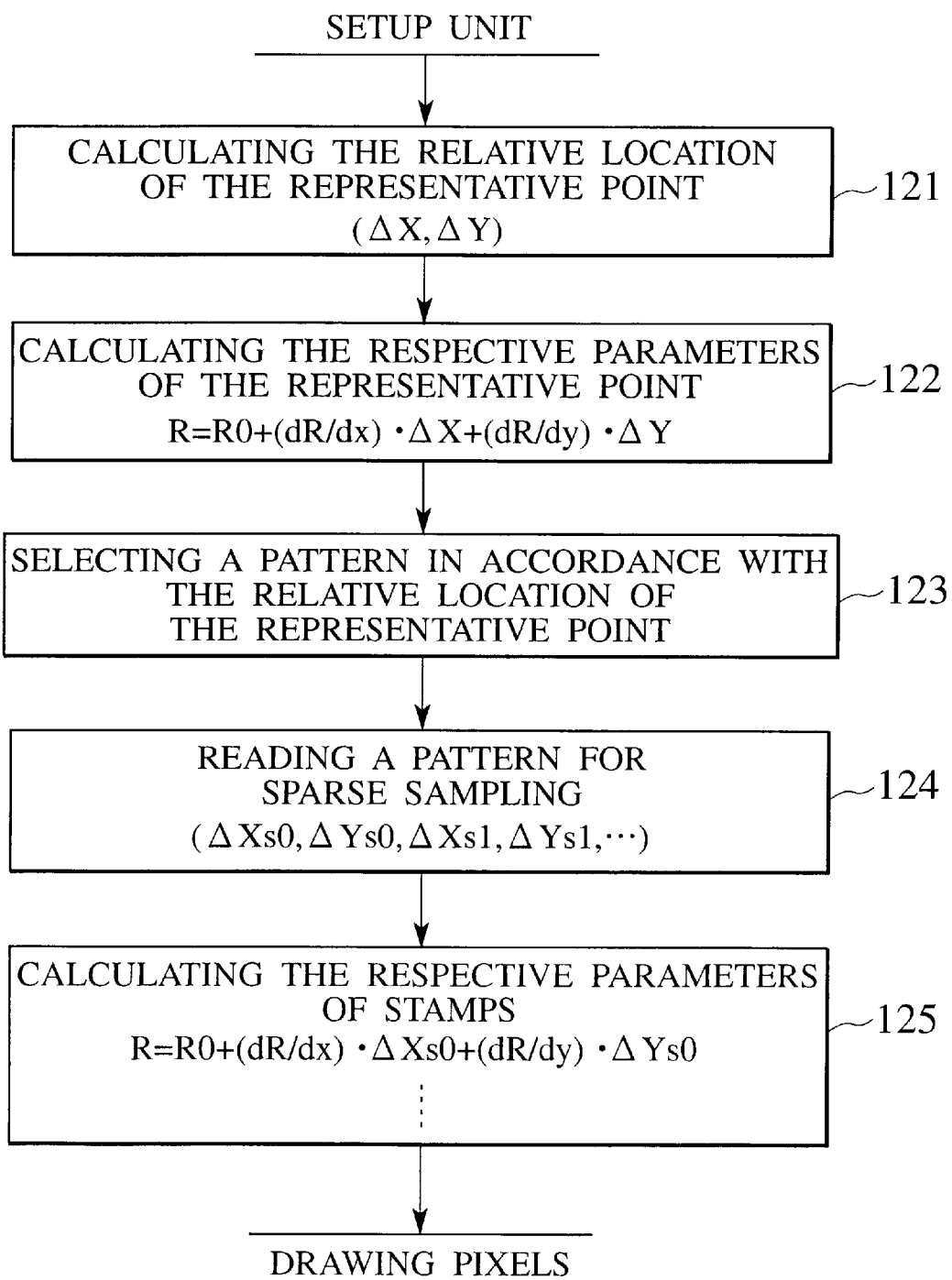
FIG. 8 is a flowchart showing the procedure from the set-up unit 3 to the pixel pipelines 6 in accordance with the embodiment 1(b).

FIG. 7 is a block diagram showing the configuration from the set-up unit 3 to the pixel pipelines 6. FIG. 8 is a flowchart showing the procedure for the respective blocks as illustrated in FIG. 7.

The set-up unit 3 functions as a polygon parameter calculating unit; a DDAX 121 as a representative point position calculating unit; a DDA color unit 122 as a representative point parameter calculating unit; an SRAM module 126 as a sampling pattern storing unit; a multiply arithmetic circuit 124 and the adder circuit 123 as a sample point parameter calculating unit; and a pattern table 125 as a sampling pattern selecting unit.

The set-up unit 3 is connected to the DDAX 121, the DDA color unit 122, the multiply arithmetic circuit 124 and the pattern table 125. The DDAX 121 is connected to the DDA color unit 122 and the pattern table 125. The DDA color unit 122 is connected to the adder circuit 123. The pattern table 125 is connected to the SRAM module 126; the SRAM module 126 to the multiply arithmetic circuit 124; and the multiply arithmetic circuit 124 to the adder circuit 123. The adder circuit 123 is connected to the pixel pipelines 6.

The functions and operations of the DDAX 121, the DDA color unit 122, the adder circuit 123, the multiply arithmetic circuit 124 and the SRAM module 126 in this embodiment of the present invention are equivalent to the DDAX 111, the DDA color unit 112, the adder circuit 113, the multiply arithmetic circuit 114 and the SRAM module 115 as illustrated in FIG. 5 so that explanation is not repeated.

The pattern table 125 is a table containing the dispersion values for use in sparse sampling. The dispersion values include a set of (ΔXs and ΔYs) indicative of the relative position of each pixel respective to the representative point.

The sparse sampling pattern to be output to the SRAM module 126 is changed in accordance with the relative position of the representative point as obtained by the DDAX 121.

First, the relative position of the representative point of a stamp in relation to the polygon drawing starting point is calculated by the DDAX 121 in the step S121.

The respective parameters of the representative point are calculated by the DDA color unit 122 in the step S122.

A sparse sampling pattern is selected in accordance with the relative position of the representative point with reference to the pattern table 125 in the step S123.

For example, one sparse sampling pattern is selected if the relative position of the representative point satisfies a predetermined condition while another sparse sampling pattern is selected if the relative position of the representative point does not satisfy a predetermined condition.

The selected sparse sampling pattern is read out from the SRAM module 126.

The respective parameters of the respective sample points are calculated by means of the multiply arithmetic circuit 124 and the adder circuit 123 in the step S125 and are allocated to the respective pixel pipelines 6.

Figure 26:
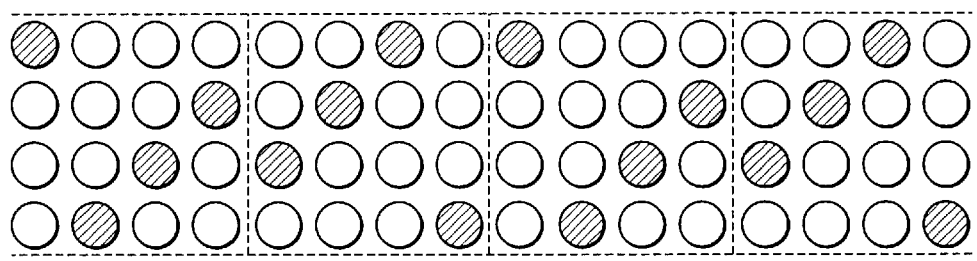
FIG. 26 is a schematic diagram showing the positional change of four subpixels selected from one stamp (including four subpixels in the lateral direction×four subpixels in the vertical direction totaling to 16 subpixels) in the internal arrangement within one stamp depending upon the position of the stamp in accordance with the embodiment 1(b).

One example of the drawing plane as obtained is illustrated in FIG. 26. In the same figure, the first and third stamps from the left have the representative points at the top left apices thereof while the second and fourth stamps from the left have the representative points at the bottom right apices thereof respectively. The relative position of the representative point is changed in accordance with the position of the stamp from the bottom right apex to the top left apex.

In the case of the system in accordance with the embodiment 1(b), the positions of the pixels to be sampled in the respective stamp are changed in accordance with the position of the respective stamp. By this configuration, it is possible to furthermore improve the quality of images as displayed by the system in accordance with the embodiment 1(a) with respect to the antialiasing advantages.

<Embodiment 1(c)>

Figure 9:
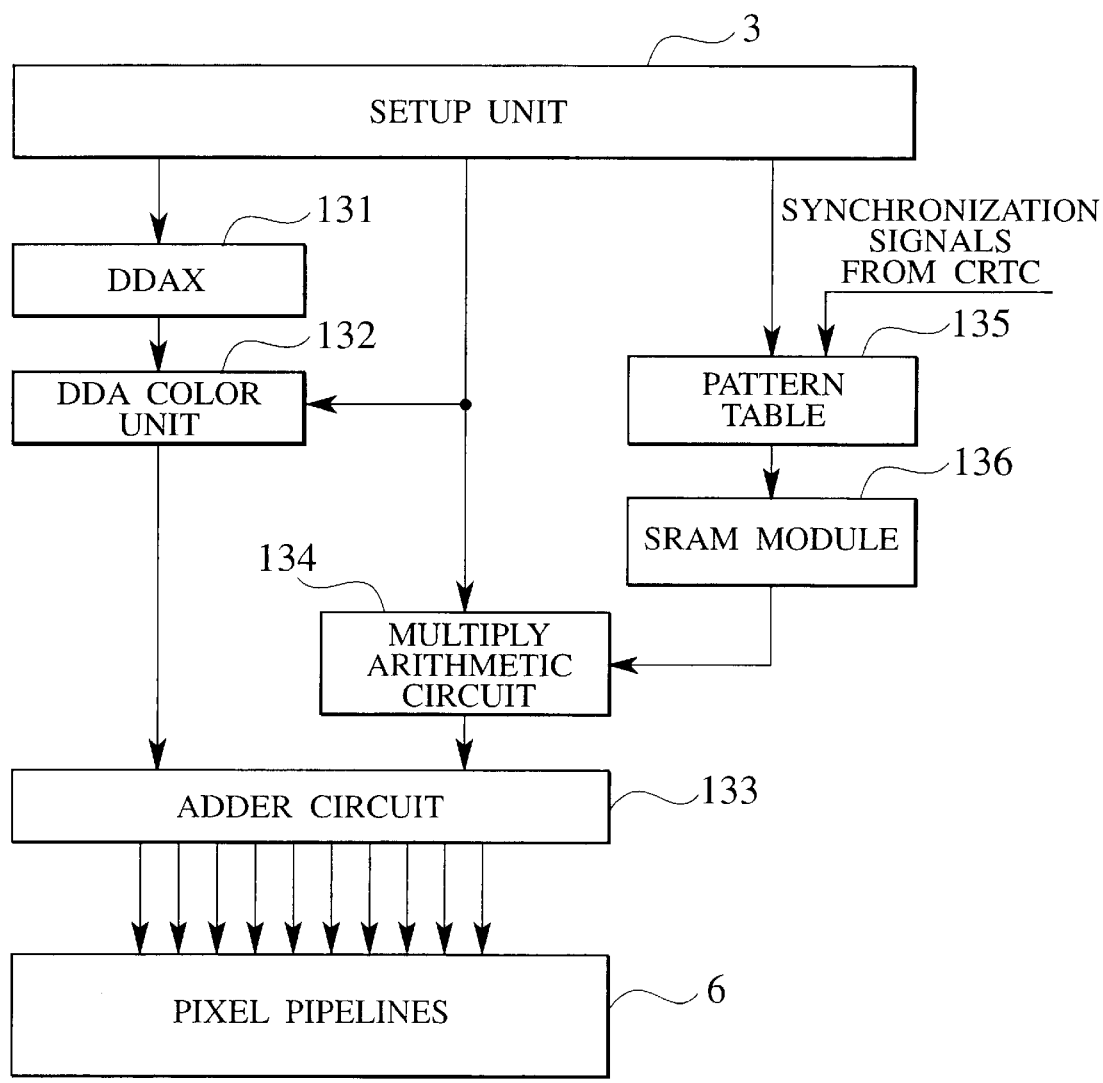
FIG. 9 is a block diagram showing the configuration from the set-up unit 3 to the pixel pipelines 6 in accordance with the embodiment 1(c).
Figure 10:
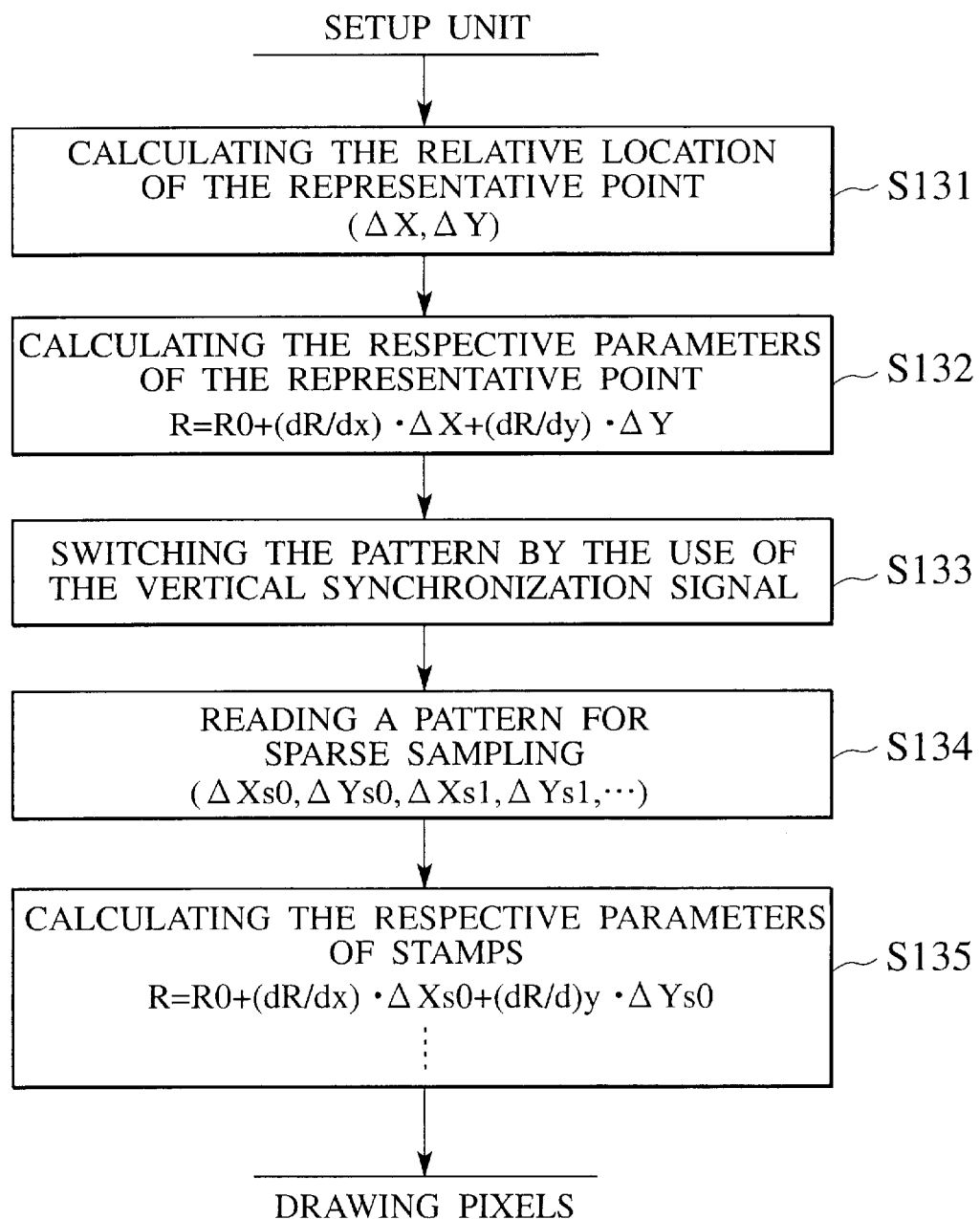
FIG. 10 is a flowchart showing the procedure from the set-up unit 3 to the pixel pipelines 6 in accordance with the embodiment 1(c).

FIG. 9 is a block diagram showing the configuration from the set-up unit 3 to the pixel pipelines 6. FIG. 10 is a flowchart showing the procedure for the respective blocks as illustrated in FIG. 9.

The set-up unit 3 functions as a polygon parameter calculating unit; a DDAX 131 as a representative point position calculating unit; a DDA color unit 132 as a representative point parameter calculating unit; an SRAM module 136 as a sampling pattern storing unit; a multiply arithmetic circuit 134 and the adder circuit 133 as a sample point parameter calculating unit; and a pattern table 135 as a sampling pattern selecting unit.

The set-up unit 3 is connected to the DDAX 131, the DDA color unit 132, the multiply arithmetic circuit 134 and the pattern table 135. The DDAX 131 is connected to the DDA color unit 132 and the pattern table 135. The pattern table 135 is connected to the SRAM module 136; the SRAM module 136 to the multiply arithmetic circuit 134; and the multiply arithmetic circuit 134 to the adder circuit 133. The adder circuit 133 is connected to the pixel pipelines 6.

The pattern for sparse sampling as output to the SRAM module 136 from the pattern table 135 in accordance with the embodiment 1(c) is changed in accordance with the synchronization signals as received from the CRT controller.

The functions and operations of the DDAX 131, the DDA color unit 132, the adder circuit 133, the multiply arithmetic circuit 134 and the SRAM module 136 in this embodiment of the present invention are equivalent to the DDAX 111, the DDA color unit 112, the adder circuit 113, the multiply arithmetic circuit 114 and the SRAM module 115 as illustrated in FIG. 5 so that explanation is not repeated.

First, the relative position of the representative point of a stamp relative to the polygon drawing starting point is calculated by the DDAX 131 in the step S131.

The respective parameters of the representative point are calculated by the DDA color unit 132 in the step S132.

The pattern table 135 is used to switch the pattern of the dispersion values to be output in synchronism with the vertical synchronization signal as received in the step S133.

For example, one sparse sampling pattern is selected from the pattern table 135 when an odd numbered vertical synchronization signal while another sparse sampling pattern is selected from the pattern table 135 when an even numbered vertical synchronization signal. The selected sparse sampling pattern is read out from the SRAM module 136 in the step S134.

The respective parameters of the respective sample points are calculated by means of the multiply arithmetic circuit 134 and the adder circuit 133 in the step S135.

Figure 27:
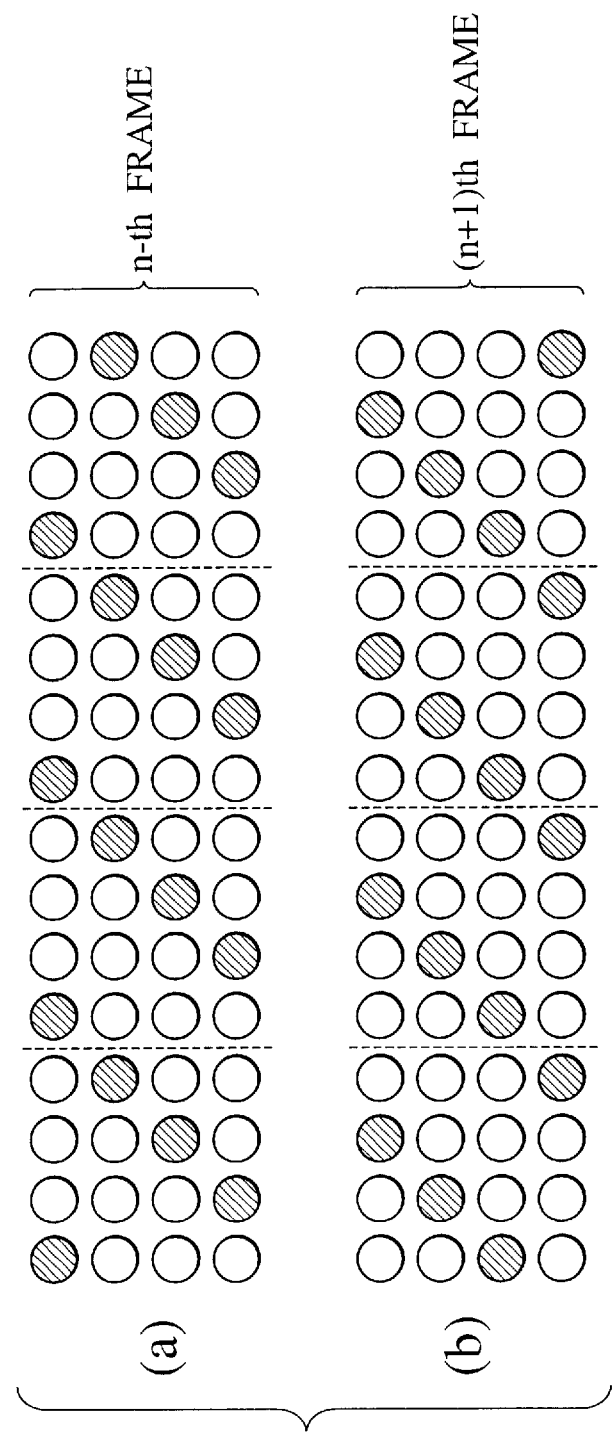
FIG. 27 is a schematic diagram showing the positional change of four subpixels selected from one stamp (including four subpixels in the lateral direction×four subpixels in the vertical direction totaling to 16 subpixels) in the internal arrangement within one stamp in response to switching the frame.

One example of the drawing plane as obtained is illustrated in FIG. 27. The respective stamps have the representative points at the top left apices thereof when an n-th frame is displayed as illustrated in FIG. 27(a) while the respective stamps have the representative points at the bottom right apices thereof when an (n+1)th frame is displayed as illustrated in FIG. 27(b) The relative position of the representative point is changed in response to the synchronization signals for switching the frame from the bottom right apex to the top left apex.

In the case of the system in accordance with the embodiment 1(c), the pattern table 135 is used to rewrite the pattern of the dispersion values in the SRAM module 136 when switching the frame. In other words, the pattern of ΔX, ΔY is switched for the respective frames. By this configuration, it is possible to furthermore improve the quality of images as displayed by the system in accordance with the embodiment 1(a) as compared with the system in accordance with the embodiment 1(a).

<Embodiment 1(d)>

Figure 11:
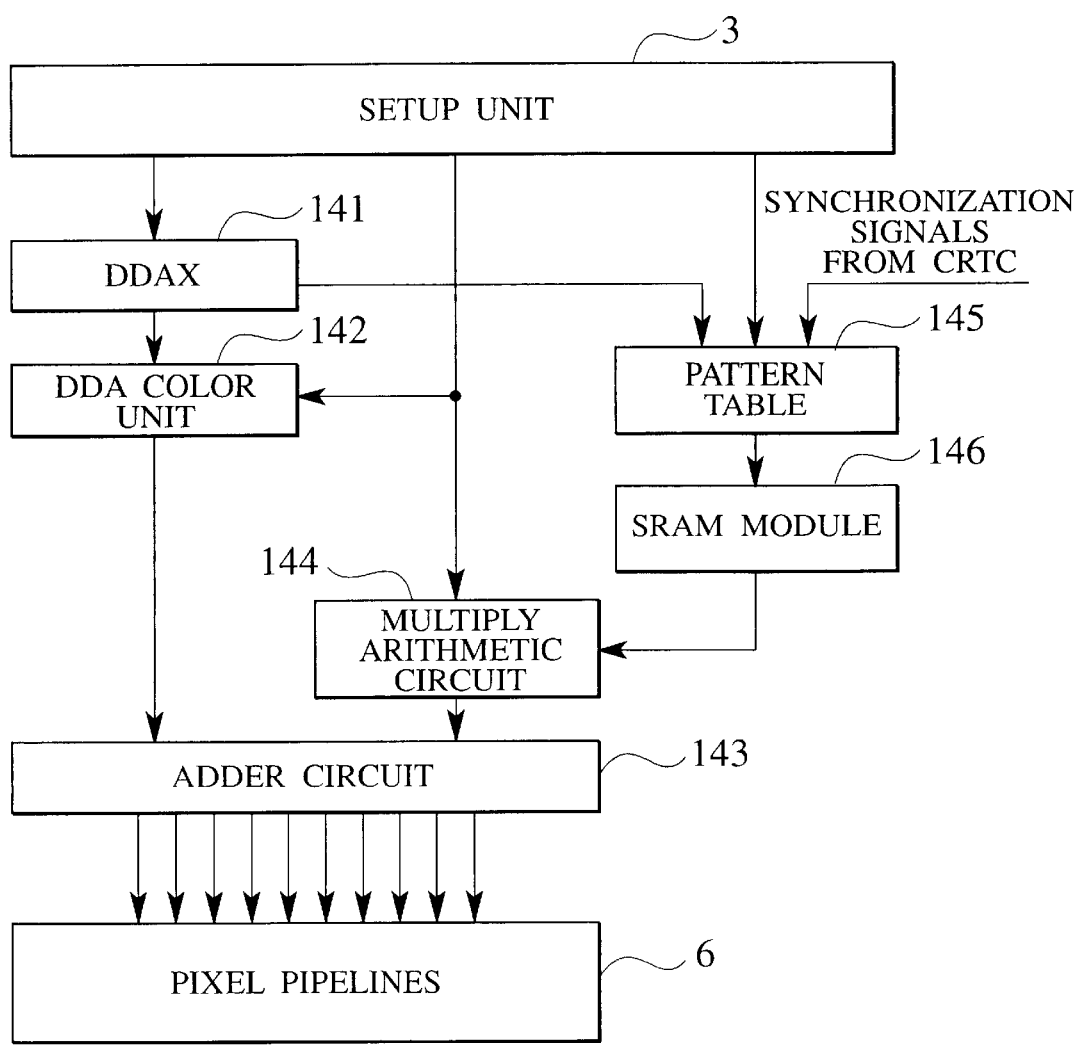
FIG. 11 is a block diagram showing the configuration from the set-up unit 3 to the pixel pipelines 6 in accordance with the embodiment 1(d).
Figure 12:
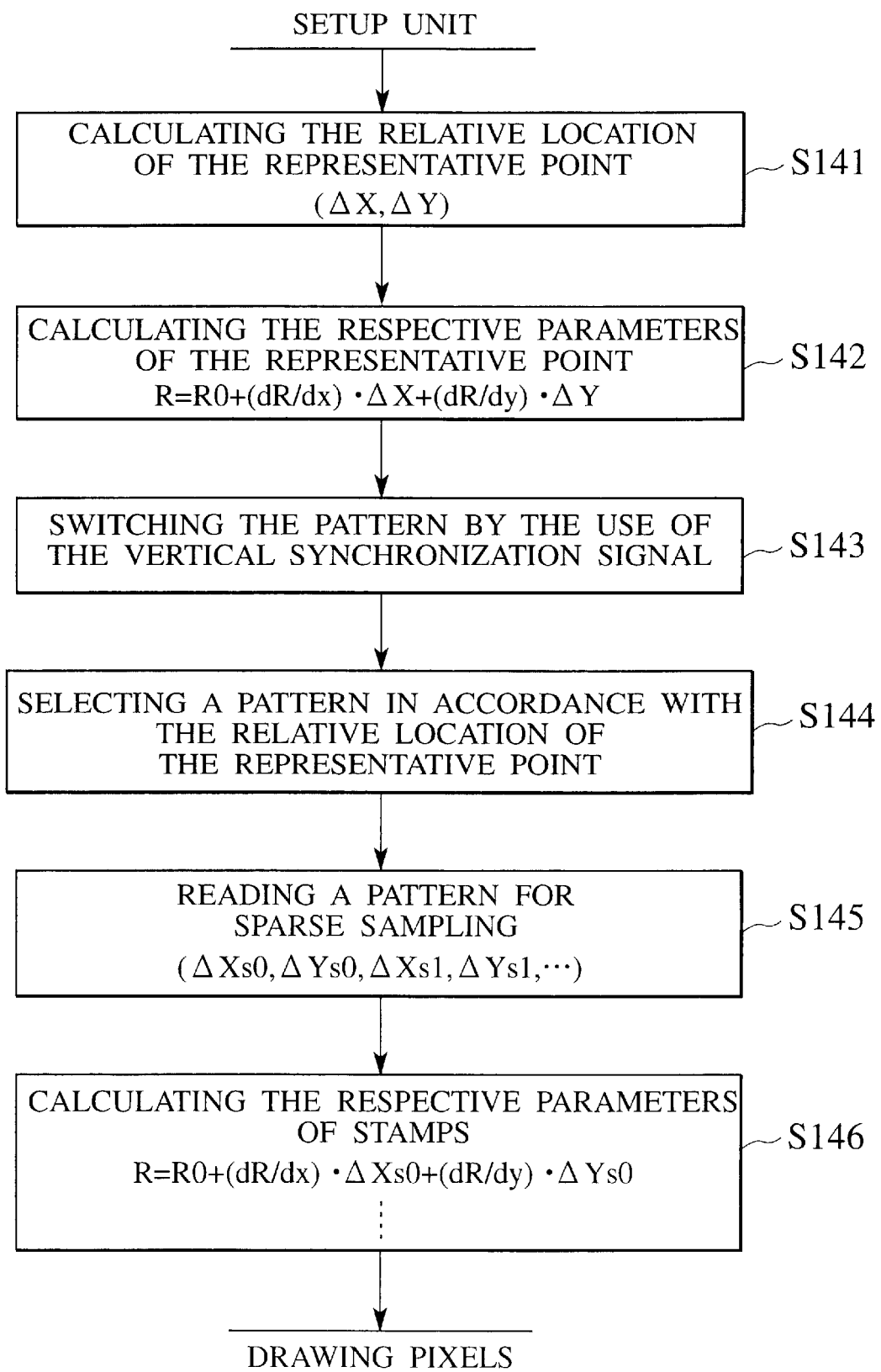
FIG. 12 is a flowchart showing the procedure from the set-up unit 3 to the pixel pipelines 6 in accordance with the embodiment 1(d).

FIG. 11 is a block diagram showing the configuration from the set-up unit 3 to the pixel pipelines 6. FIG. 12 is a flowchart showing the procedure for the respective blocks as illustrated in FIG. 11.

The set-up unit 3 functions as a polygon parameter calculating unit; a DDAX 141 as a representative point position calculating unit; a DDA color unit 142 as a representative point parameter calculating unit; an SRAM module 146 as a sampling pattern storing unit; a multiply arithmetic circuit 144 and the adder circuit 143 as a sample point parameter calculating unit; and a pattern table 145 as a sampling pattern selecting unit.

The set-up unit 3 is connected to the DDAX 141, the DDA color unit 142, the multiply arithmetic circuit 144 and the pattern table 145. The DDAX 141 is connected to the DDA color unit 142 and the pattern table 145. The DDA color unit 142 is connected to the adder circuit 143. The pattern table 145 is connected to the SRAM module 146; the SRAM module 146 to the multiply arithmetic circuit 144; and the multiply arithmetic circuit 144 to the adder circuit 143. The adder circuit 143 is connected to the pixel pipelines 6.

The pattern for sparse sampling as output to the SRAM module 146 from the pattern table 145 in accordance with the embodiment 1(d) is changed in accordance with the relative position of the representative point as received from the DDAX 141 and the synchronization signals as received from the CRT controller.

The functions and operations of the DDAX 141, the DDA color unit 142, the adder circuit 143, the multiply arithmetic circuit 144 and the SRAM module 146 in this embodiment of the present invention are equivalent to the DDAX 111, the DDA color unit 112, the adder circuit 113, the multiply arithmetic circuit 114 and the SRAM module 115 as illustrated in FIG. 5 so that explanation is not repeated.

First, the relative position of the representative point of a stamp relative to the polygon drawing starting point is calculated by the DDAX 141 in the step S141.

The respective parameters of the representative point are calculated by the DDA color unit 142 in the step S142.

The set of patterns for sparse sampling is switched by the use of the vertical synchronization signal in the step S143.

A pattern is selected for sparse sampling in accordance with the relative position of the representative point in the step S144 and read out from the pattern table 145 in the step S145.

The respective parameters of the respective sample points are calculated by means of the multiply arithmetic circuit 144 and the adder circuit 143 in the step S145.

Figure 28:
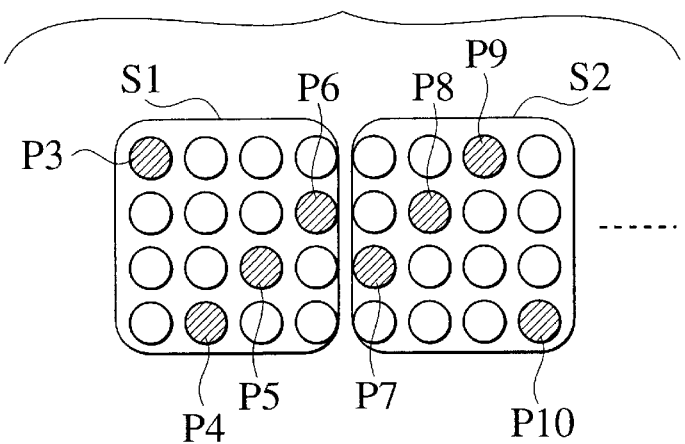
FIG. 28 is a schematic diagram showing the positional change of four subpixels selected from one stamp in the internal arrangement within one stamp depending upon the position of the stamp in accordance with the embodiment 1(b).
Figure 29:
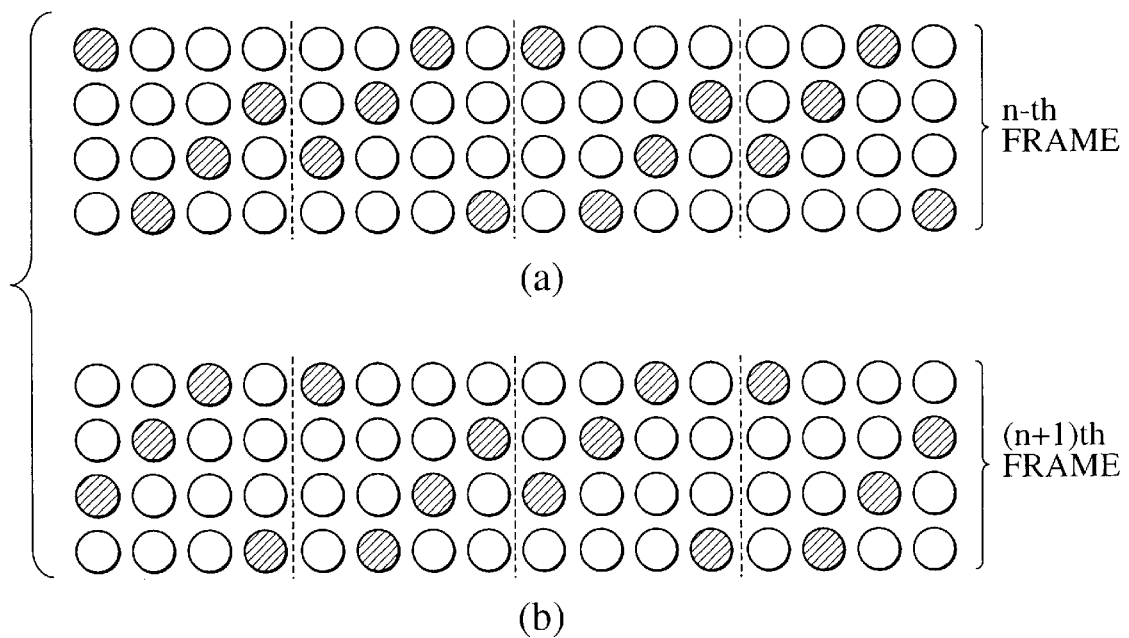
FIG. 29 is a schematic diagram showing the positional change of four subpixels selected from one stamp in the internal arrangement within one stamp depending upon 1) the position of the stamp and also 2) in response to switching the frame in accordance with the embodiment 1(b).

One example of the drawing plane as obtained is illustrated in FIG. 28 and FIG. 29. FIG. 28 is an exemplary schematic diagram showing different sparse sampling patterns for different relative positions of the representative points. In the same figure, the stamp S1 has a representative point at the top left apex and the other three points (subpixels P4, P5 and P6), i.e., the point (the subpixel P4) as distant from the representative point to the right by one subpixel and to the bottom by three subpixels, the point (the subpixel P5) as distant from the representative point to the right by two subpixels and to the bottom by two subpixels, and the point (the subpixel P6) as distant from the representative point to the right by three subpixels and to the bottom by one subpixel. In the same figure, the stamp S2 has a representative point at the bottom right apex and the other three points (subpixels P7, P8 and P9), i.e., the point (the subpixel P7) as distant from the representative point to the left by three subpixels and to the top by one subpixel, the point (the subpixel P8) as distant from the representative point to the left by two subpixels and to the top by two subpixels, and the point (the subpixel P9) as distant from the representative point to the left by one subpixel and to the top by three subpixels.

FIG. 29 is an exemplary schematic diagram showing different relative positions of the representative points and different sparse sampling patterns for different frames. In the same figure (a), when an n-th frame is displayed, the first and third stamps from the left have the representative points and the sparse sampling patterns in the same fashion as the stamp S1 illustrated in FIG. 28 while the second and fourth stamps from the left have the representative points and the sparse sampling patterns in the same fashion as the stamp S2 illustrated in FIG. 28. In the same figure (b), when an (n+1)th frame is displayed, the first and third stamps from the left have the representative points and the sparse sampling patterns in the same fashion as the stamp S2 illustrated in FIG. 28 while the second and fourth stamps from the left have the representative points and the sparse sampling patterns in the same fashion as the stamp S1 illustrated in FIG. 28.

It is therefore possible to furthermore improve the quality of images as displayed by the system in accordance with the embodiment 1(d), as compared with the systems in accordance with the embodiment 1(a), the embodiment 1(b) and the embodiment 1(c), by switching the sampling pattern in accordance with both the relative position of the representative point and the ordinal position of the frame as displayed.

<Embodiment 2>

Figure 13:
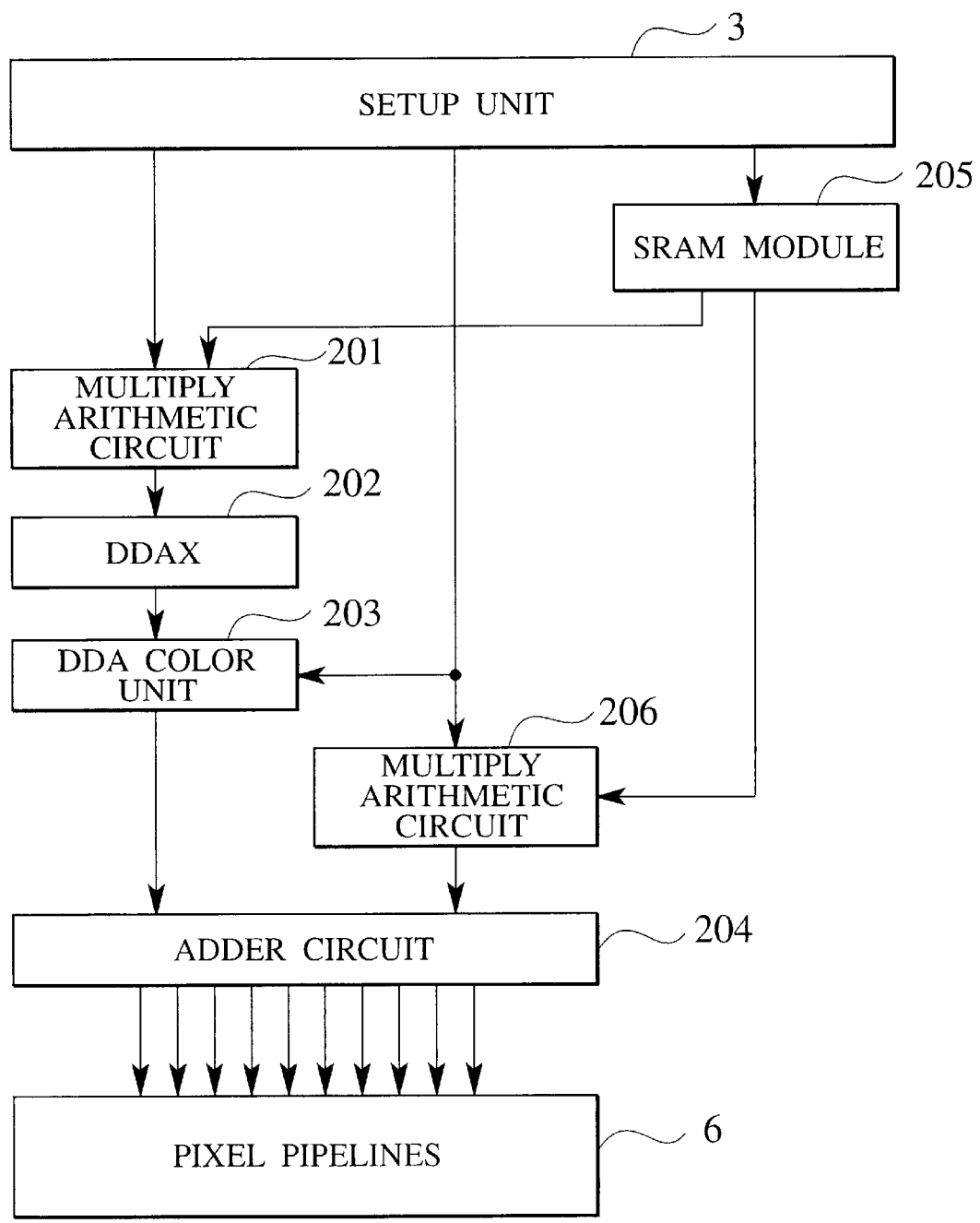
FIG. 13 is a block diagram showing the configuration from the set-up unit 3 to the pixel pipelines 6 in accordance with the embodiment 2.
Figure 14:
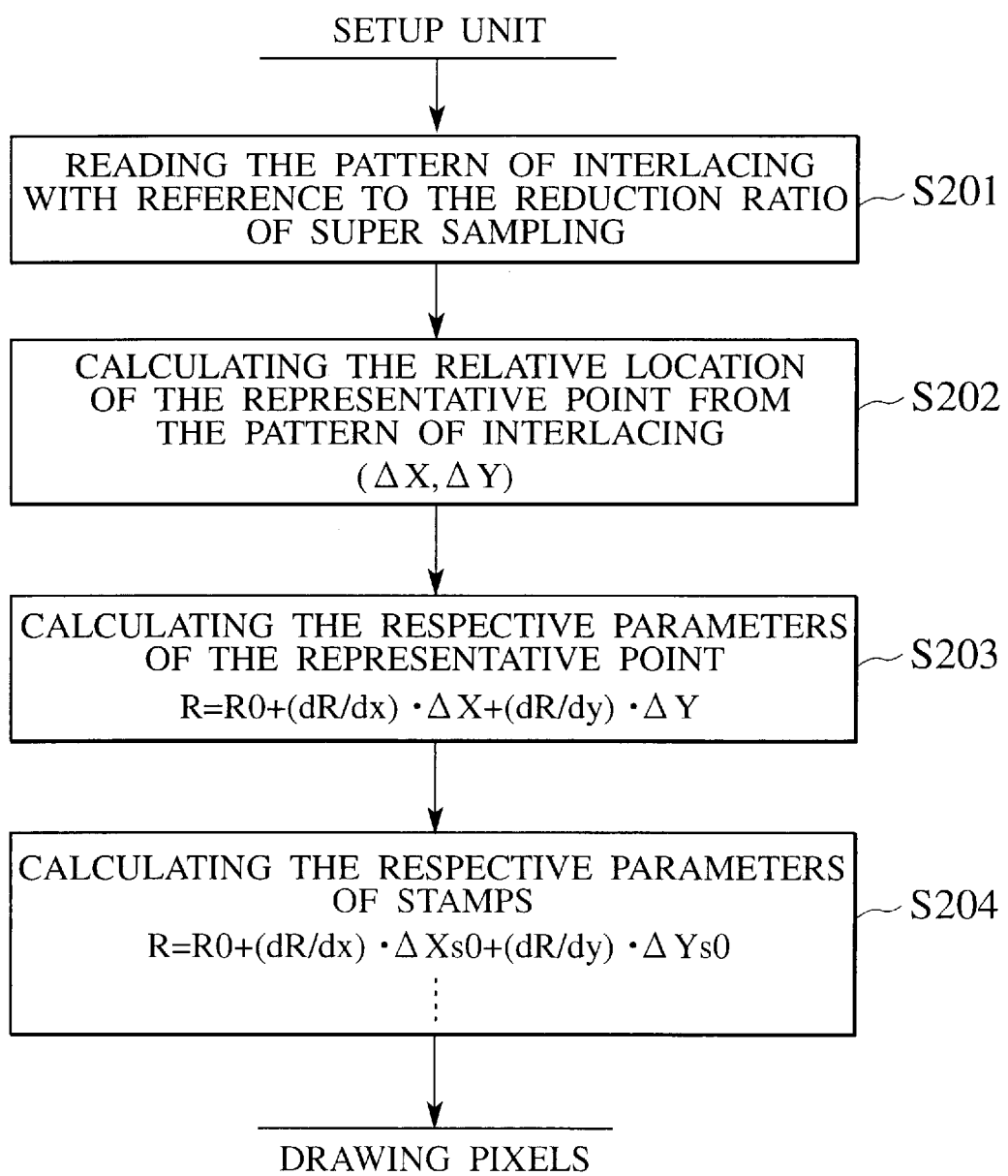
FIG. 14 is a flowchart showing the procedure from the set-up unit 3 to the pixel pipelines 6 in accordance with the embodiment 2.

FIG. 13 is a block diagram showing the configuration from the set-up unit 3 to the pixel pipelines 6. FIG. 14 is a flowchart showing the procedure for the respective blocks as illustrated in FIG. 13.

The set-up unit 3 functions as a polygon parameter calculating unit; a DDAX 202 as a representative point position calculating unit; a DDA color unit 203 as a representative point parameter calculating unit; an SRAM module 205 as a y-direction increment storing unit; and a multiply arithmetic circuit 206 and the adder circuit 204 as a sample point parameter calculating unit.

The set-up unit 3 is connected to the multiply arithmetic circuit 201, the DDA color unit 203, the multiply arithmetic circuit 206 and the SRAM module 205. The multiply arithmetic circuit 201 is connected to the DDAX 202; the DDAX 202 to the DDA color unit 203; and the DDA color unit 203 to the adder circuit 204.

The SRAM module 205 is connected to the multiply arithmetic circuit 201 and the multiply arithmetic circuit 206 which is connected to the adder circuit 204. The adder circuit 204 is connected to the pixel pipelines 6.

The multiply arithmetic circuit 201 in accordance with the embodiment 2 serves to multiply the distance between sample points as obtained from the set-up unit 3 by the y-direction increment as obtained from the SRAM module 205 in order to calculate the distance between the representative point of a scanning line having been completely drawn and the representative point of the next scanning line to be drawn.

The functions and operations of the DDAX 202, the DDA color unit 203, the adder circuit 204, the multiply arithmetic circuit 206 and the SRAM module 205 in this embodiment of the present invention are equivalent to the DDAX 111, the DDA color unit 112, the adder circuit 113, the multiply arithmetic circuit 114 and the SRAM module 115 as illustrated in FIG. 5 so that explanation is not repeated.

First, the interlacing pattern is read out from the SRAM module 205 with reference to the reduction ratio of super sampling in the step S201.

The reduction ratio in this case is indicative of into what number of the subpixels one pixel is divided. For example, the reduction ratio is 4×4 if one pixel is divided into four subpixels in the lateral direction and four subpixels in the vertical direction totaling to 16 subpixels.

The interlacing pattern means the y-direction increment, i.e., the distance between the representative point of a scanning line having been completely drawn and the representative point of the next scanning line to be drawn. For example, in the case of repeating alternately drawing and skipping the consecutive four lines of the subpixels in the manner as drawing four lines of subpixels, skipping next four lines of subpixels without drawing, drawing further four lines of subpixels, skipping further next four lines of subpixels without drawing and so on, the y-direction increment is 8.

The relative position of the representative points are calculated with reference to the interlacing pattern by the use of the multiply arithmetic circuit 201 and the DDAX 202 in the step S202. The relative position calculated in this case is the relative position of the next scanning line relative to the representative point of the current scanning line having been. The calculation of the relative position is performed when a region judgement unit (not shown in the figure) judges that the draw stamp has reached the boundary line of the polygon. For example, in the case where one pixel is divided into four subpixels in the vertical direction and where the pixels in a polygon are drawn from the left edge to the right edge followed by returning to the left edge again for drawing the next line in accordance with a non-interlaced control, the y-coordinate of the representative point is incremented by $4 \times \Delta Y$ (i.e., four times the interval between the subpixels in the y-direction). However, in accordance with an interlaced control, the y-coordinate of the representative point has to be incremented by $8 \times \Delta Y$ (i.e., eight times the interval between the subpixels in the y-direction) in the same configuration.

The respective parameters of the representative point are calculated by the use of the DDA color unit 203 in the step S203.

The respective parameters of the respective sample points are calculated by the use of the multiply arithmetic circuit 206 and the adder circuit 204 in the step S204.

Figure 30:
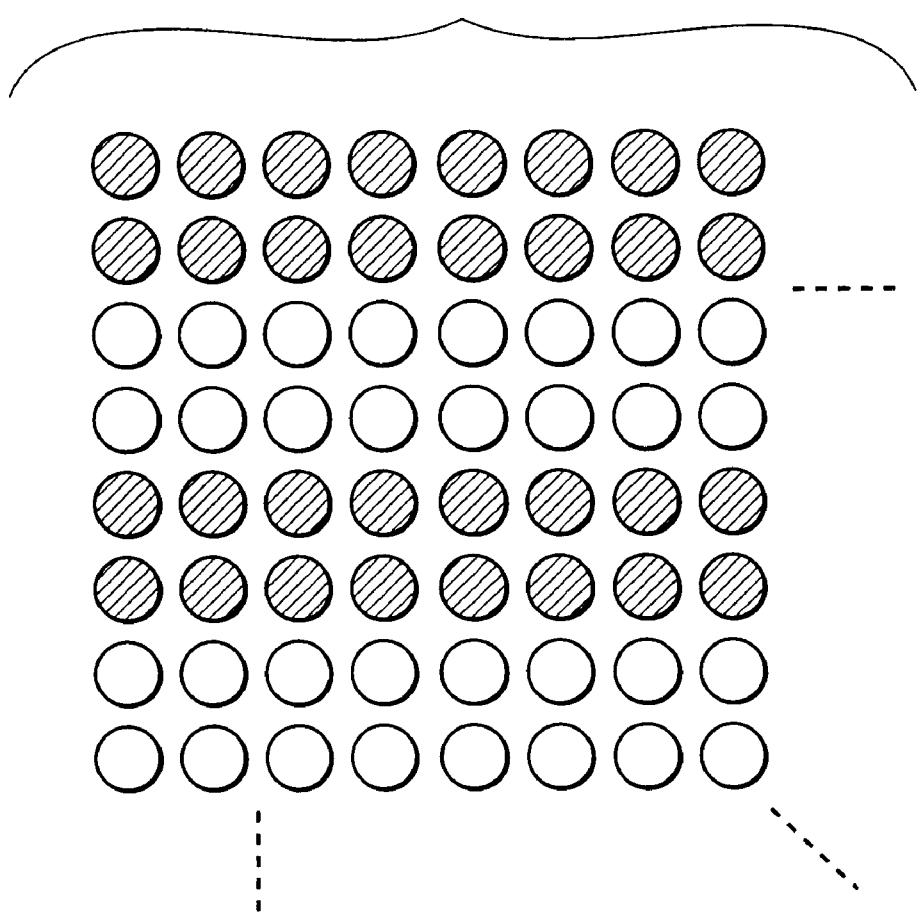
FIG. 30 is a schematic diagram showing an interlaced image generated by repeating the process of drawing a couple of scanning lines followed by skipping the next couple of scanning lines in accordance with the embodiment 2.

In the case where interlaced images are generated by 2×2 super sampling in accordance with the system of the present embodiment, the pixels as sampled are as illustrated in FIG. 30. As compared with 4×4 stamps, half the subpixels are not drawn. In the actual case, image data required for displaying one field can be generated by drawing alternate pairs of adjacent lines in the vertical direction. The operation of the image processing system will be explained in the followings in the case where interlaced images are generated from stamps of 4×4 by super sampling P×P subpixels ($P=2^n$) per one stamp.

2×2 super sampling is performed in order that one pixel is divided into two subpixels in the lateral direction×two subpixels in the vertical direction totaling to 4. Namely, in the case of 2×2 super sampling, four subpixels correspond to one pixel on the display device.

On the other hand, a 4×4 stamp is used in the case where four subpixels in the lateral direction×four subpixels in the vertical direction, totaling to 16 subpixels, are drawn at a time in parallel. Namely, four pixels are processed in parallel in the case where a 4×4 stamp is treated by 2×2 super sampling.

A) 1×1 SUPER SAMPLING (ONLY INTERLACING, NOT DIVIDING INTO SUBPIXELS)

Figure 31:
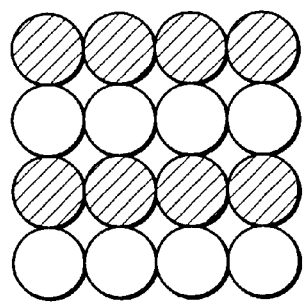
FIG. 31 is a schematic diagram showing the pixels within a stamp which are drawn/skipped in the case where an interlaced image is generated by repeating the process of drawing a scanning line followed by skipping the next scanning line in accordance with the embodiment 2.

The pixels as drawn are as illustrated in FIG. 31 so that actual rendering of images is performed at points on every other line. Stored in the SRAM module 205 is data required for drawing the pixels on every other line within one stamp.

B) 2×2 SUPER SAMPLING

Figure 32:
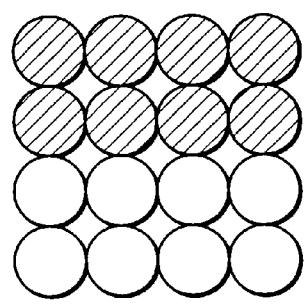
FIG. 32 is a schematic diagram showing the pixels within a stamp which are drawn/skipped in the case where an interlaced image is generated by repeating the process of drawing a couple of scanning lines followed by skipping the next couple of scanning lines in accordance with the embodiment 2.

The pixels as drawn are as illustrated in FIG. 32 so that actual rendering of images is performed at points on every other pair of adjacent lines. Stored in the SRAM module 205 is data required for drawing the pixels on every other pair of adjacent lines within one stamp.

C) 4×4, 8×8 . . . SUPER SAMPLING

Figure 33:
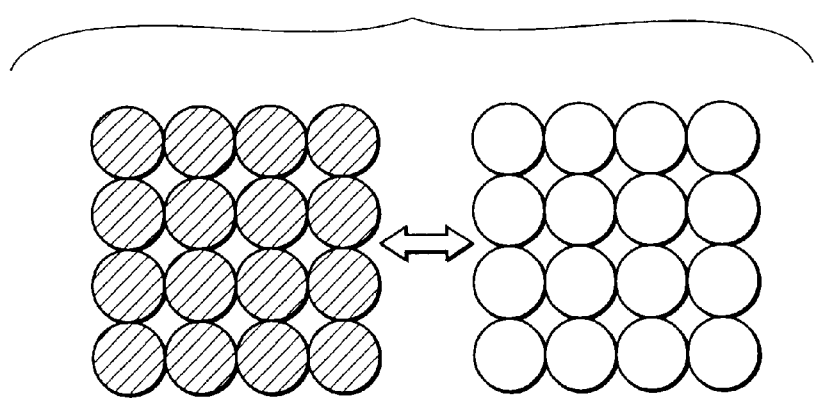
FIG. 33 is a schematic diagram showing field switching associated with the positional change of the pixels within a stamp which are drawn/skipped in the case where an interlaced image is generated by repeating the process of drawing consecutive four scanning lines followed by skipping the next consecutive four scanning lines in accordance with the embodiment 2.

The pixels as drawn are as illustrated in FIG. 33. 4×4 super sampling is performed by repeating the process of drawing one scanning line followed by skipping the next scanning line so that, after completing drawing of a scanning line, the representative point of the next drawing is located separated from that of the previous drawing by one scanning line as skipped. In usual cases, a polygon is drawn by dividing the polygon into a plurality of lines and separately drawing the respective lines. In the case of a parallel drawing system for handling M×N stamps, a polygon is divided into groups of N lines. Each group of N lines is called a scanning line. Namely, the representative point of the stamp for the next scanning line is obtained by an increment of 8 lines rather than an increment of 4 lines in the y-direction. 8×8 super sampling is performed by repeating the process of drawing two scanning lines followed by an increment of 16 lines for the subsequent drawing. Super sampling of a higher resolution is performed by repeating the process of drawing P/4 scanning lines followed by an increment of P/2 lines for the subsequent drawing of the next P/4 scanning lines.

In accordance with the system of the present embodiment, when the interlaced images are generated, it is possible to reduce the number of the pixels to be drawn to half by selectively drawing scanning lines required for displaying images. As a result, as compared with a conventional technique, a field of the same resolution can be drawn only with the amount of computation reduced to half and the required graphics memory reduced to half.

<Embodiment 3>

Figure 34:
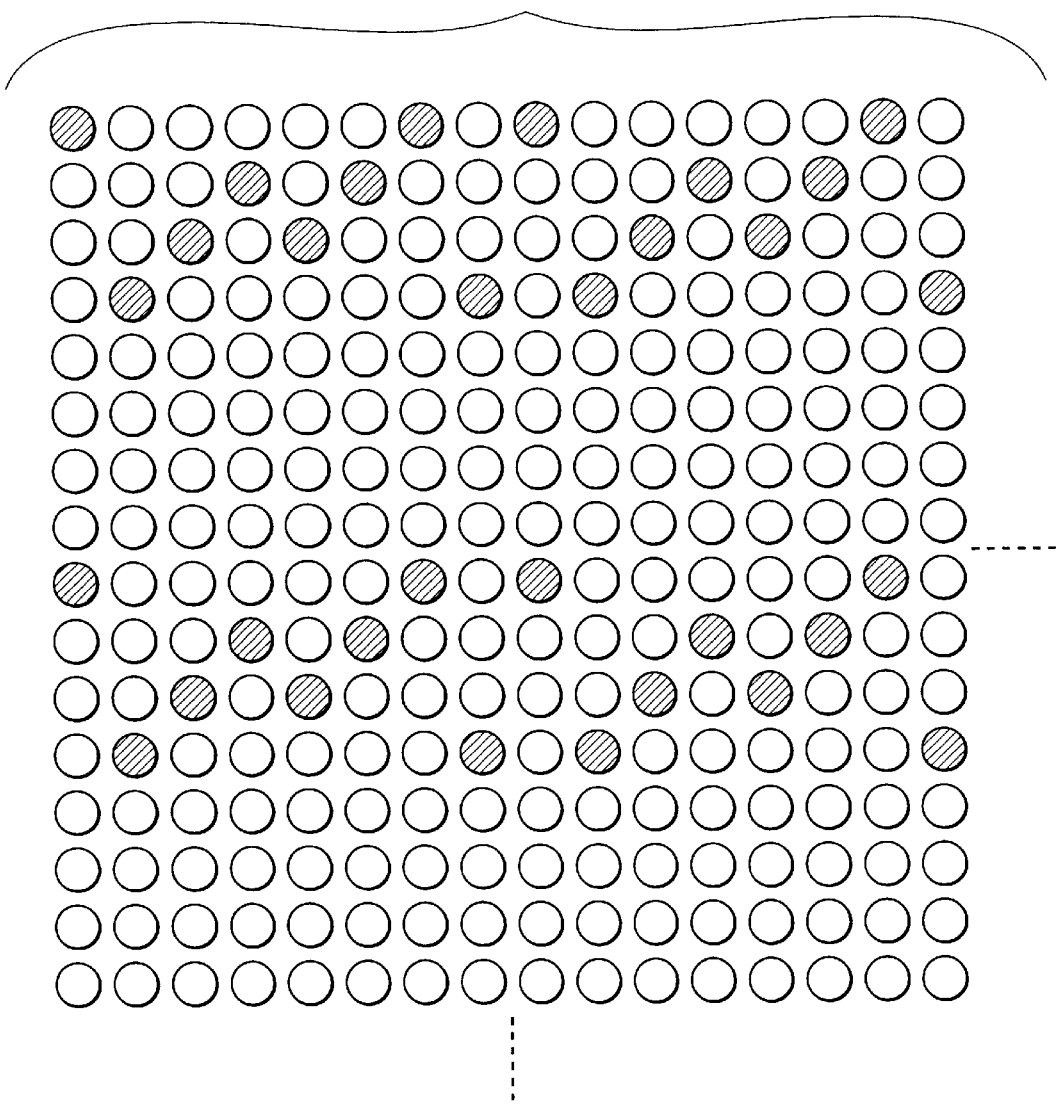
FIG. 34 is a schematic diagram showing pixels drawn by selecting four subpixels from a stamp consisting of four subpixels in the lateral direction×four subpixels in the vertical direction in the case where an interlaced image is generated by repeating the process of drawing consecutive four scanning lines followed by skipping the next consecutive four scanning lines in accordance with the embodiment 2.

FIG. 34 is a schematic diagram showing an example of generating an interlaced image by sparse sampling four points from a stamp of 4×4 subpixels consisting of four subpixels in the lateral direction×four subpixels in the vertical direction totaling to 16 subpixels.

The following description is made in the case of generating an interlaced image by P×P sparse sampling. A stamp is composed of M×N subpixels.

The term "P×P sparse sampling" means a sampling technique which is performed in order that several points are selected among from a P×P subpixel matrix while the stamp composed of M×N is a stamp having a width of M subpixels and a height of N subpixels.

<Embodiment 3(a)>

Figure 15:
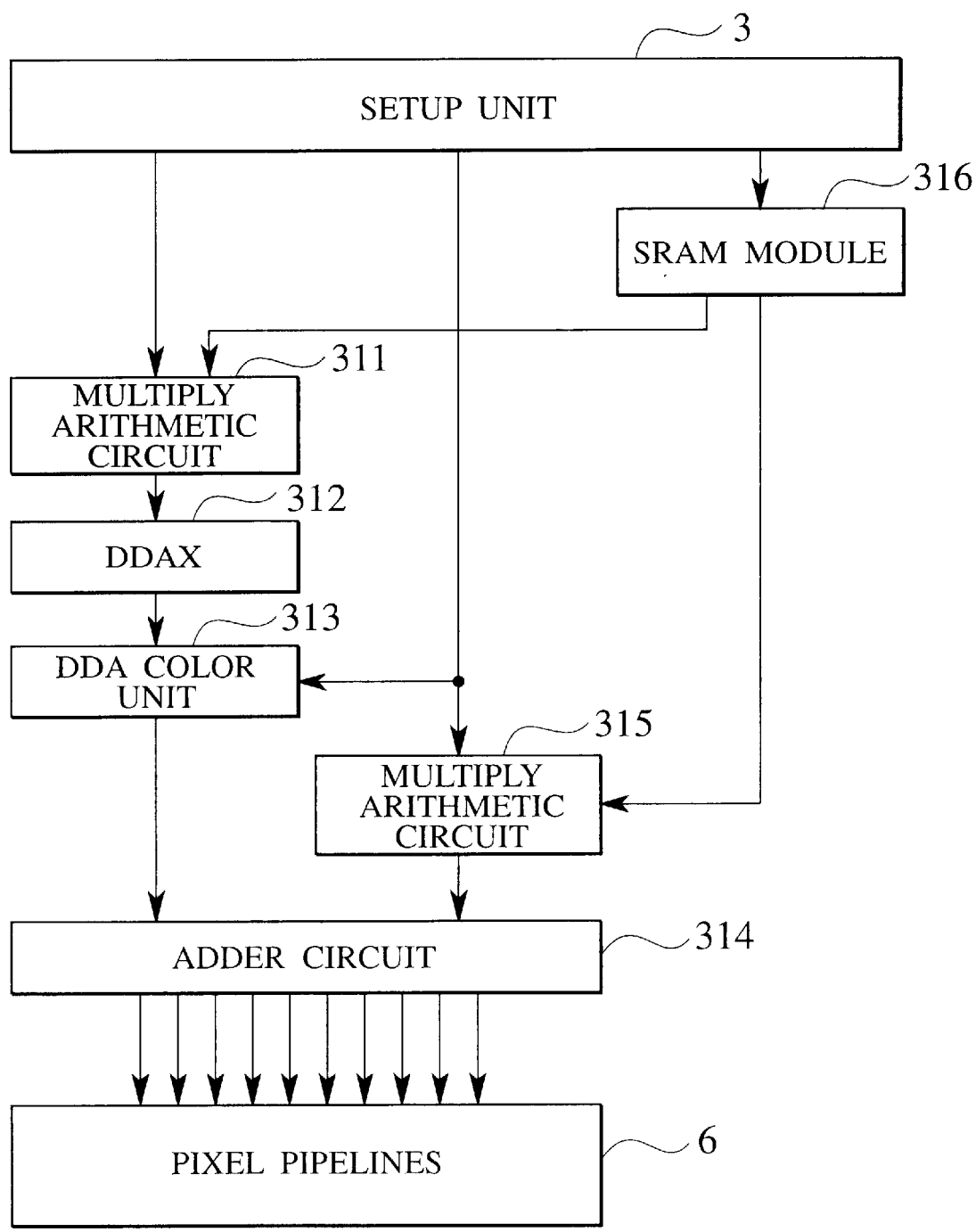
FIG. 15 is a block diagram showing the configuration from the set-up unit 3 to the pixel pipelines 6 in accordance with the embodiment 3(a).
Figure 16:
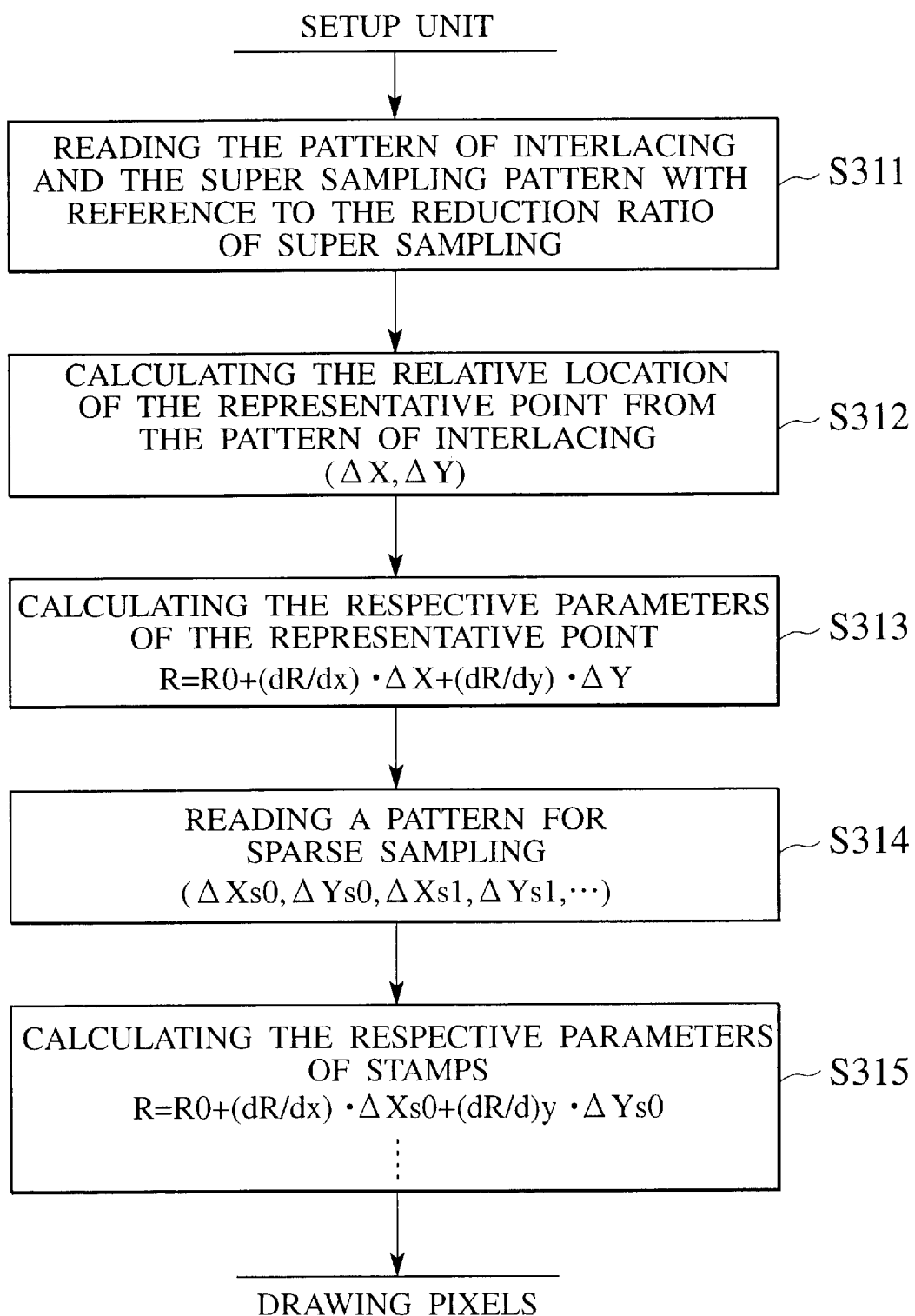
FIG. 16 is a flowchart showing the procedure from the set-up unit 3 to the pixel pipelines 6 in accordance with the embodiment 3(a).

FIG. 15 is a block diagram showing the configuration from the set-up unit 3 to the pixel pipelines 6. FIG. 16 is a flowchart showing the procedure for the respective blocks as illustrated in FIG. 15.

The set-up unit 3 functions as a polygon parameter calculating unit; a DDAX 312 as a representative point position calculating unit; a DDA color unit 313 as a representative point parameter calculating unit; an SRAM module 316 as a y-direction increment storing unit; and a multiply arithmetic circuit 315 and the adder circuit 314 as a sample point parameter calculating unit.

The set-up unit 3 is connected to the multiply arithmetic circuit 311, the multiply arithmetic circuit 315 and the SRAM module 316. The multiply arithmetic circuit 311 is connected to the DDAX 312; the DDAX 312 to the DDA color unit 313; and the DDA color unit 313 to the adder circuit 314. The SRAM module 316 is connected to the multiply arithmetic circuit 311 and the multiply arithmetic circuit 315 which is connected to the adder circuit 314. The adder circuit 314 is connected to the pixel pipelines 6.

The SRAM module 316 of the embodiment 3(a) receives and stores a super sampling pattern and an interlacing pattern as sized in agreement with the reduction ratio of the super sampling from the set-up unit 3 for each stamp. The patterns $\Delta Y$, $\Delta Ys$ and $\Delta Xs$ are then transferred to the multiply arithmetic circuit 311 and the multiply arithmetic circuit 315.

The super sampling pattern and the interlacing pattern are then read out from the SRAM module 316 in accordance with the reduction ratio of the super sampling in the step S311.

The relative position of the representative point is calculated from the interlacing pattern by means of the DDAX 312 in the step S312. The relative position calculated in this case is the relative position of the next scanning line relative to the representative point of the current scanning line having been. The calculation of the relative position is performed when a region judgement unit (not shown in the figure) judges that the draw stamp has reached the boundary line of the polygon. For example, in the case where one pixel is divided into four subpixels in the vertical direction and where the pixels in a polygon are drawn from the left edge to the right edge followed by returning to the left edge again for drawing the next line in accordance with a non-interlaced control, the y-coordinate of the representative point is incremented by 4×ΔY (i.e., four times the interval between the subpixels in the y-direction). However, in accordance with an interlaced control, the y-coordinate of the representative point has to be incremented by 8×ΔY (i.e., eight times the interval between the subpixels in the y-direction) in the same configuration.

The respective parameters of the representative point are calculated by the use of the DDA color unit 313 in the step S313. A pattern for sparse sampling is read out from the SRAM module 316 to the multiply arithmetic circuit 315 in the step S314.

The respective parameters of the sample points in the stamp are calculated by means of the adder circuit 314 in the step S315 and are allocated to the respective pixel pipelines 6.

Figure 35:
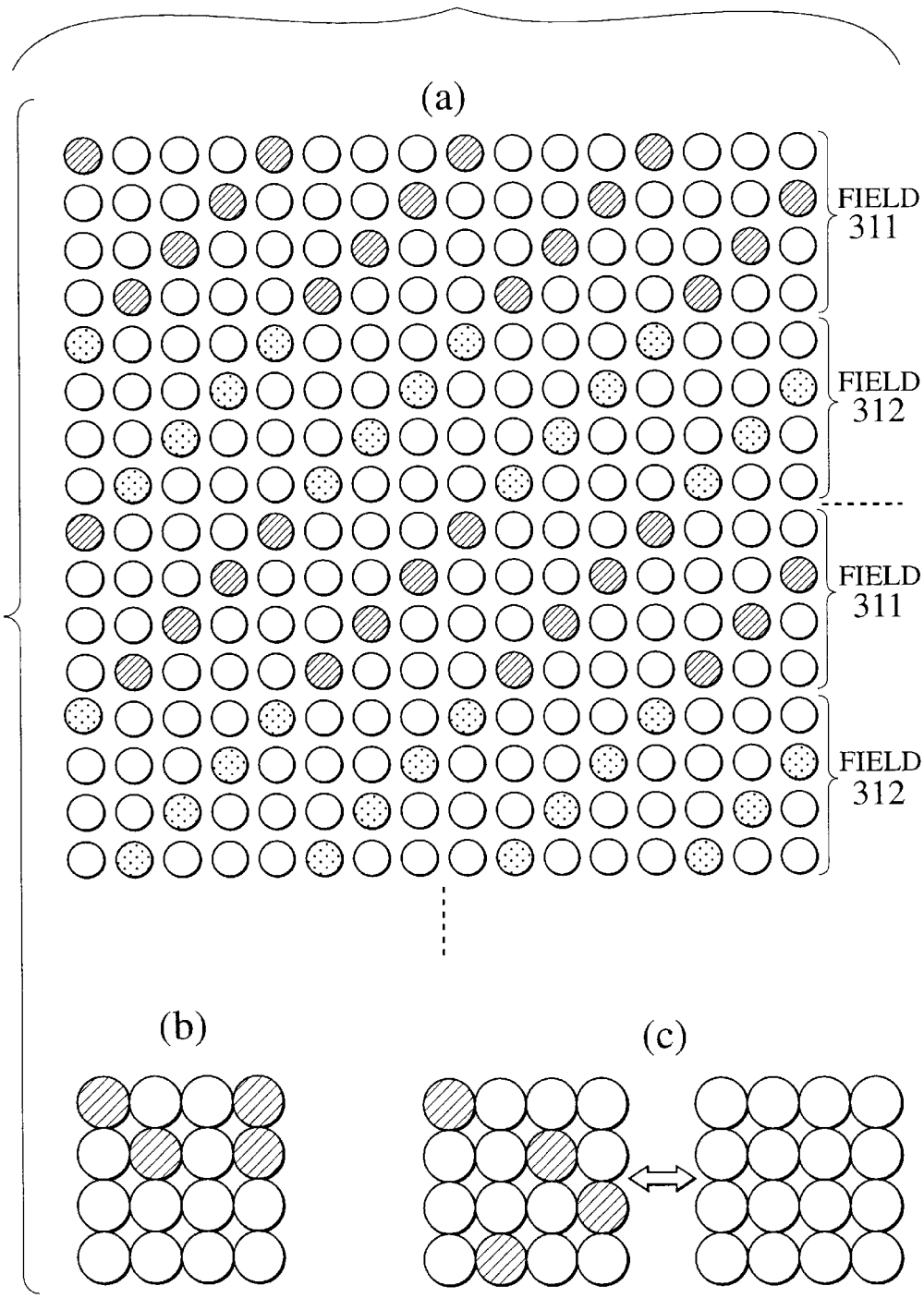
FIG. 35 is a schematic diagram showing one example of the drawing plane as obtained in accordance with the embodiment 3(a).

One example of the drawing plane as obtained in the case of the embodiment 3(a) is illustrated in FIG. 35.

Meanwhile, there are some key points as follows.

A) In the case where N>P (i.e., the size of the stamp is greater than the size of sparse sampling), the pixels as drawn are as illustrated in FIG. 35(b) so that actual rendering of images is performed to generate pixels drawn with a vertical interval of P lines skipped.

Stored in the SRAM module 316 is data required for drawing the pixels on every other P lines within one stamp.

B) In the case where N<=P (i.e., the size of the stamp is not greater than the size of sparse sampling), the pixels as drawn are as illustrated in FIG. 35(c). P×P super sampling is performed by repeating the process of drawing P/N scanning lines followed by an increment of 2×P lines for the subsequent drawing of the next P/N scanning lines. Stored in the SRAM module 316 is data required for drawing in this manner.

In accordance with the system of the present embodiment, one image displayed on a screen is divided into two fields each of which is separately drawn, it is therefore possible to halve the number of the pixels to be drawn on one field and reduce the hardware costs. Furthermore, it is possible to increase the number of levels of halftone images with the same capacity of the graphics memory and the same amount of computation as required of a conventional technique.

<Embodiment 3(b)>

Figure 17:
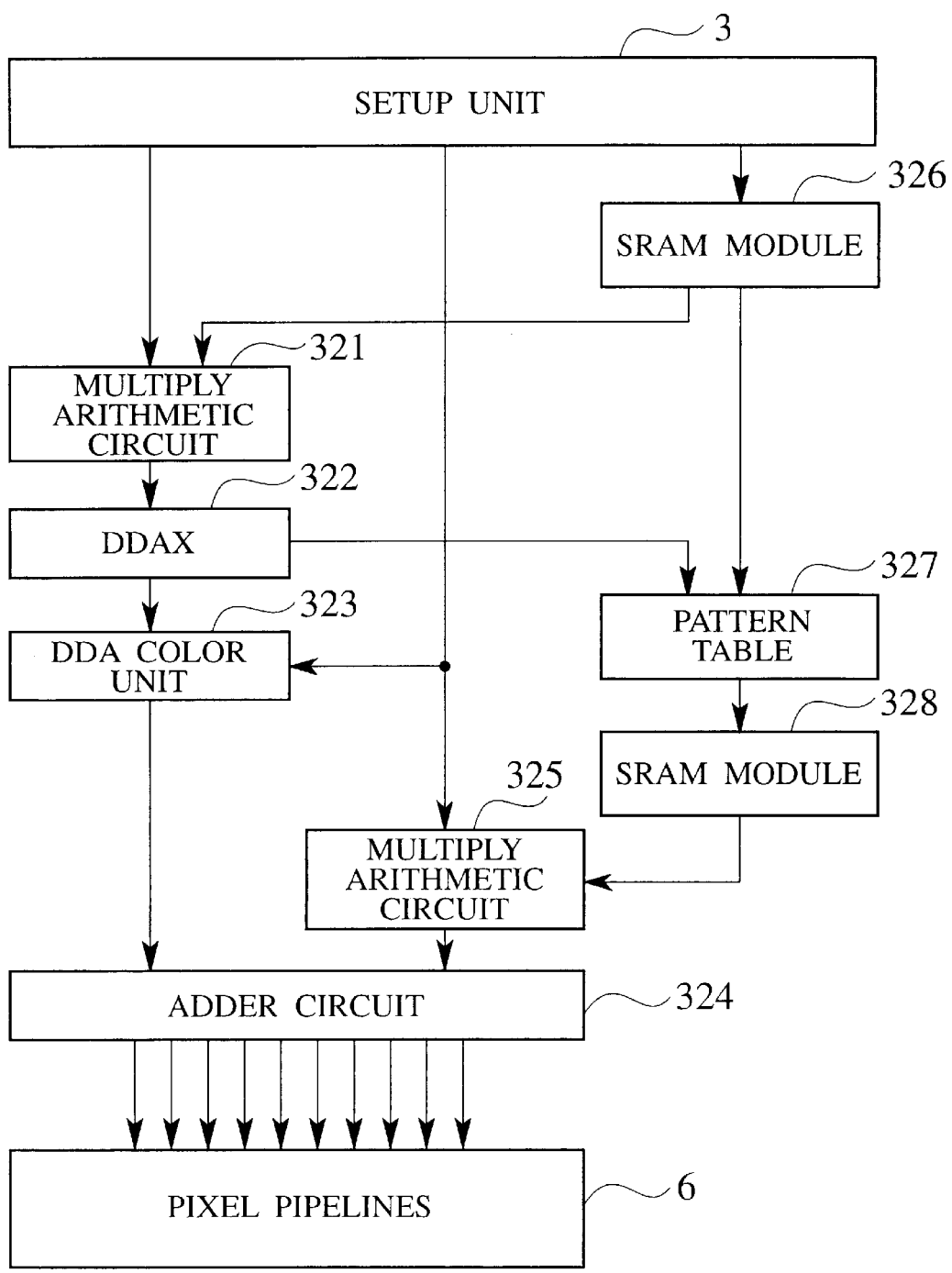
FIG. 17 is a block diagram showing the configuration from the set-up unit 3 to the pixel pipelines 6 in accordance with the embodiment 3(b).
Figure 18:
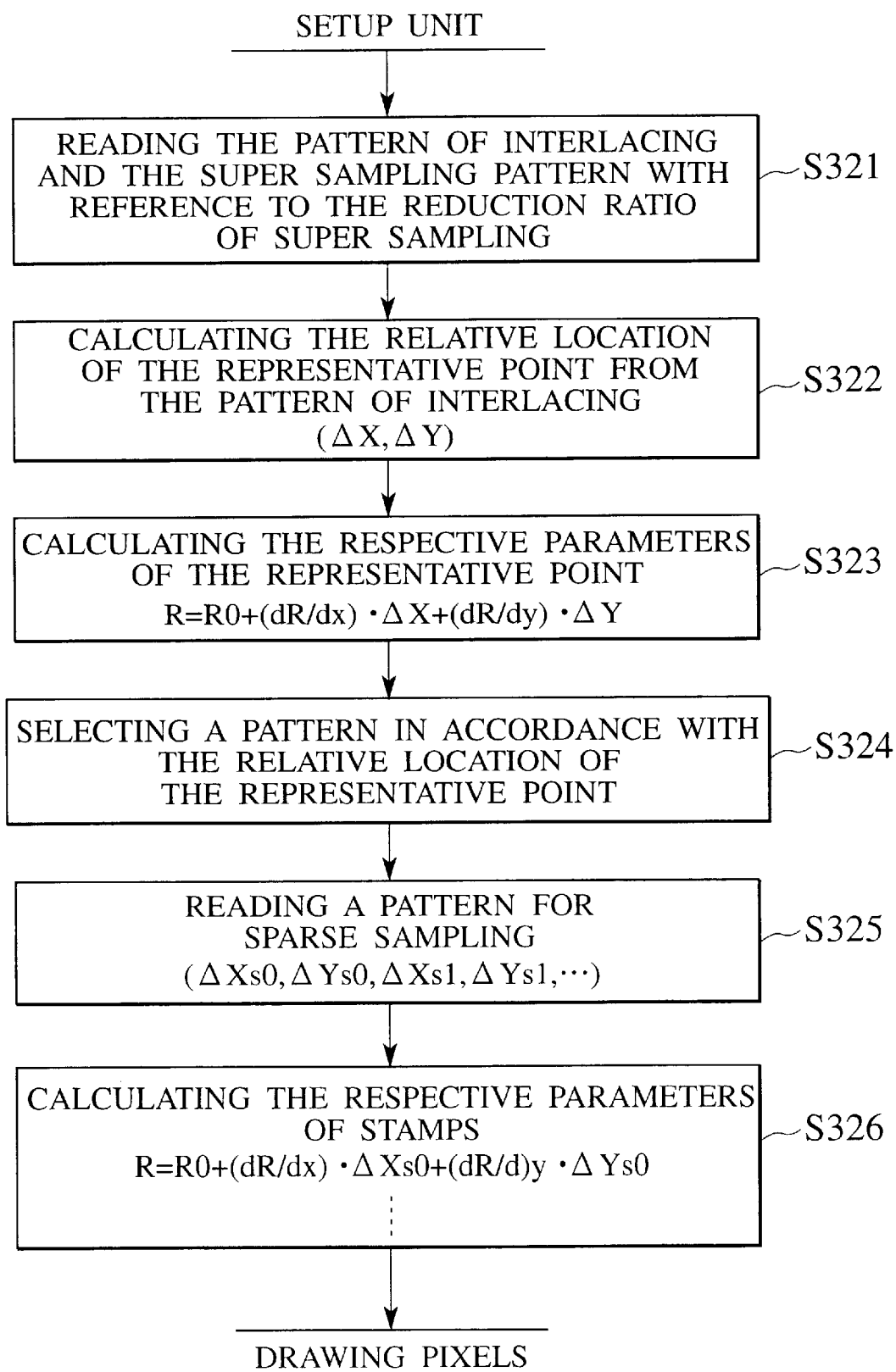
FIG. 18 is a flowchart showing the procedure from the set-up unit 3 to the pixel pipelines 6 in accordance with the embodiment 3(b).

FIG. 17 is a block diagram showing the configuration from the set-up unit 3 to the pixel pipelines 6. FIG. 18 is a flowchart showing the procedure for the respective blocks as illustrated in FIG. 17.

The set-up unit 3 functions as a polygon parameter calculating unit; a DDAX 322 as a representative point position calculating unit; a DDA color unit 323 as a representative point parameter calculating unit; an SRAM module 326 as a y-direction increment storing unit; an SRAM module 328 as a sampling pattern storing unit; a multiply arithmetic circuit 325 and the adder circuit 324 as a sample point parameter calculating unit and the pattern table 327 as a sampling pattern selecting unit.

The set-up unit 3 is connected to the multiply arithmetic circuit 321, the DDA color unit 323, the multiply arithmetic circuit 321 and the SRAM module 326. The multiply arithmetic circuit 321 is connected to the DDAX 322 while the DDAX 322 is connected to the DDA color unit 323 and the pattern table 327. The DDA color unit 323 is connected to the adder circuit 324. The SRAM module 326 is connected to the pattern table 327; the pattern table 327 to the SRAM module 328; the SRAM module 328 to the multiply arithmetic circuit 325; and the multiply arithmetic circuit 325 to the adder circuit 324. The adder circuit 324 is connected to the pixel pipelines 6.

The SRAM module 326 of the embodiment 3(b) receives and stores a super sampling pattern and an interlacing pattern as sized in agreement with the reduction ratio of the super sampling from the set-up unit 3 for each stamp. The patterns ΔY, ΔYs and ΔXs are then transferred to the multiply arithmetic circuit 311 and the multiply arithmetic circuit 315.

The super sampling pattern and the interlacing pattern are then read out from the SRAM module 326 in accordance with the reduction ratio of the super sampling in the step S321.

The relative position of the representative point is calculated from the interlacing pattern by means of the DDAX 322 in the step S322. The relative position calculated in this case is the relative position of the next scanning line relative to the representative point of the current scanning line having been. The calculation of the relative position is performed when a region judgement unit (not shown in the figure) judges that the draw stamp has reached the boundary line of the polygon.

The respective parameters of the representative point are calculated by the DDA color unit 323 in the step S323.

The sparse sampling pattern is switched in accordance with the relative position of the representative point in the step S324, and a new sparse sampling pattern is fetched from the pattern table 327.

The sparse sampling pattern is then read out from the SRAM module 328 in the step S325.

The respective parameters of the respective sample points within the stamp are calculated by means of the multiply arithmetic circuit 325 in the step S326.

Figure 36:
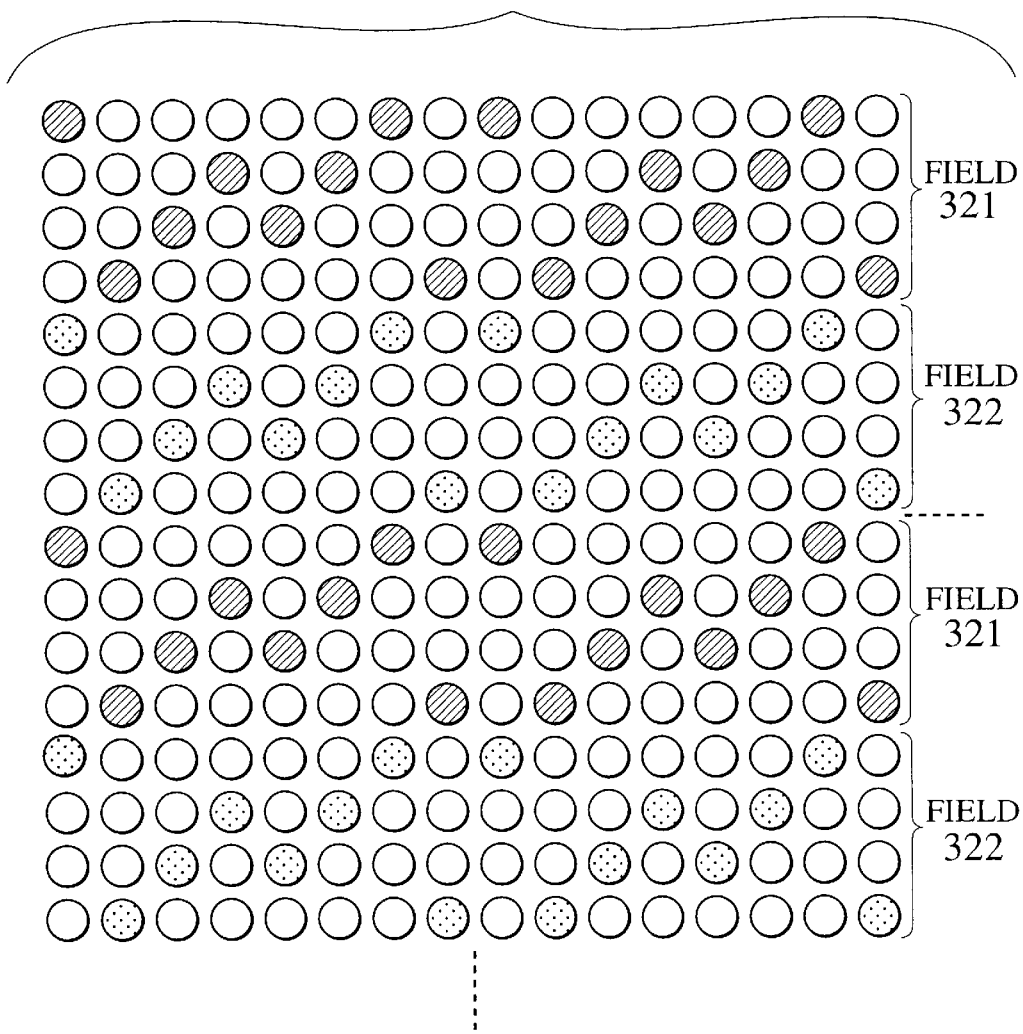
FIG. 36 is a schematic diagram showing one example of the drawing plane as obtained in accordance with the embodiment 3(b).

One example of the drawing plane as obtained in the case of the embodiment 3(b) is illustrated in FIG. 36. In either of the field 321 and the field 322, the positional relationship between the representative point and the respective points of the other subpixels is varied in accordance with the position of the representative point. However, there is no difference between the positional relationship of the other subpixels to the representative point in the field 321 and the positional relationship of the other subpixels to the representative point in the field 322.

A) In the case where N>P (i.e., the size of the stamp is greater than the size of sparse sampling), the pixels as drawn are as illustrated in FIG. 35(b) so that actual rendering of images is performed to generate pixels drawn with a vertical interval of P lines skipped.

Stored in the SRAM module 326 is data required for drawing the pixels on every other P lines within one stamp.

B) In the case where N<=P (i.e., the size of the stamp is not greater than the size of sparse sampling), the pixels as drawn are as illustrated in FIG. 35(c).

P×P super sampling is performed by repeating the process of drawing P/N scanning lines followed by an increment of 2×P lines for the subsequent drawing of the next P/N scanning lines. Stored in the SRAM module 326 is data required for drawing in this manner.

In accordance with the system of the present embodiment, it is possible to halve the number of the pixels to be drawn on one field and reduce the hardware costs. Furthermore, it is possible to increase the number of levels of halftone images with the same capacity of the graphics memory and the same amount of computation as required of a conventional technique and to render graphics data to generate a higher quality of images, as compared with the case in accordance with the embodiment 3(a), by switching the sparse sampling pattern as fetched from the pattern table 327 in accordance with the position of the stamp.

<Embodiment 3(c)>

Figure 19:
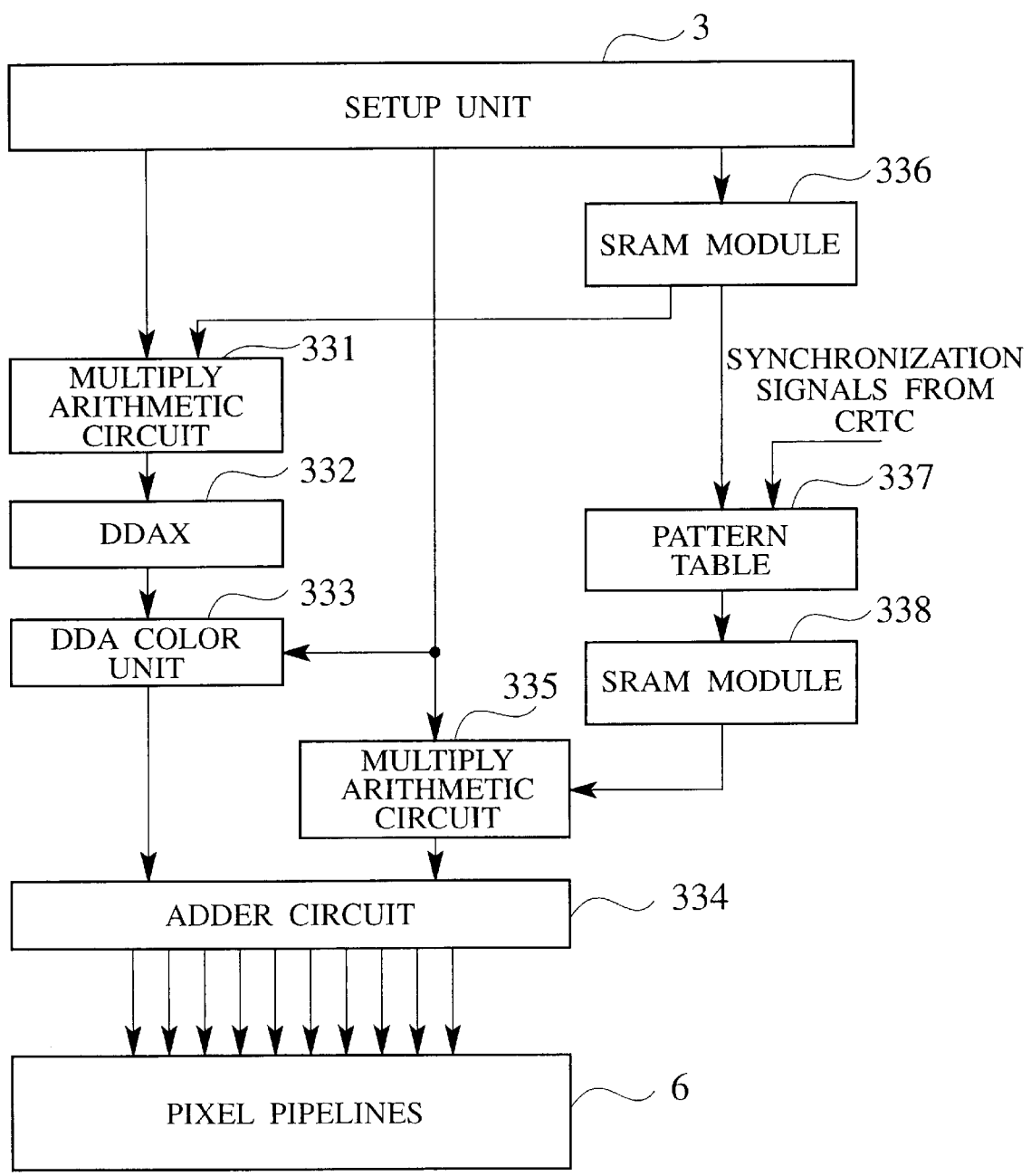
FIG. 19 is a block diagram showing the configuration from the set-up unit 3 to the pixel pipelines 6 in accordance with the embodiment 3(c).
Figure 20:
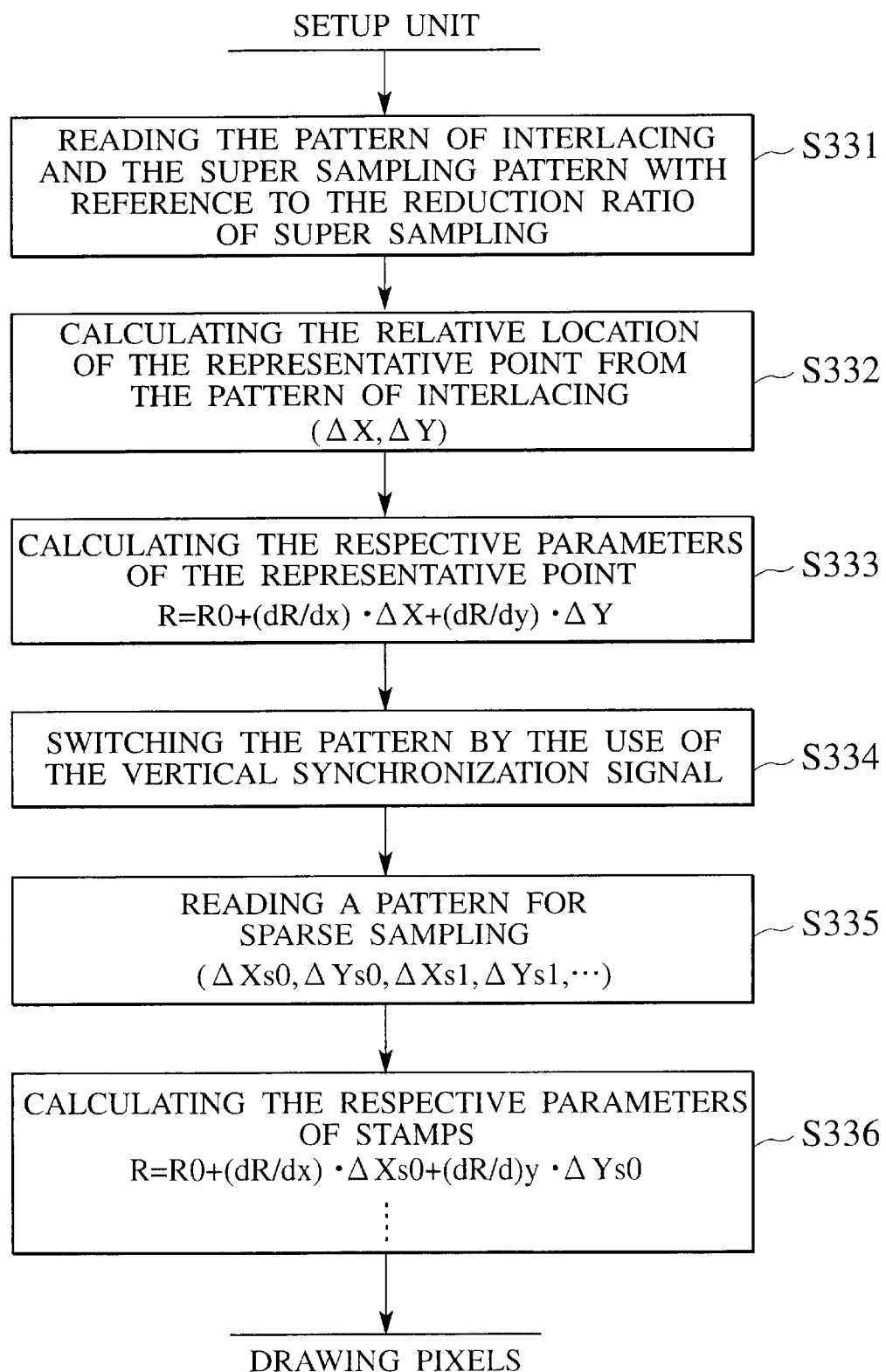
FIG. 20 is a flowchart showing the procedure from the set-up unit 3 to the pixel pipelines 6 in accordance with the embodiment 3(c).

FIG. 19 is a block diagram showing the configuration from the set-up unit 3 to the pixel pipelines 6. FIG. 20 is a flowchart showing the procedure for the respective blocks as illustrated in FIG. 19.

The set-up unit 3 functions as a polygon parameter calculating unit; a DDAX 332 as a representative point position calculating unit; a DDA color unit 333 as a representative point parameter calculating unit; an SRAM module 336 as a y-direction increment storing unit; an SRAM module 338 as a sampling pattern storing unit; a multiply arithmetic circuit 335 and the adder circuit 334 as a sample point parameter calculating unit; and the pattern table 337 as a sampling pattern selecting unit.

The set-up unit 3 is connected to the multiply arithmetic circuit 331, the DDA color unit 333, the multiply arithmetic circuit 331 and the SRAM module 336. The multiply arithmetic circuit 331 is connected to the DDAX 332; the DDAX 332 is connected to the DDA color unit 333; and the DDA color unit 333 to the adder circuit 334; The SRAM module 336 is connected to the multiply arithmetic circuit 331 and the pattern table 337; the pattern table 337 to the SRAM module 338; the SRAM module 338 to the multiply arithmetic circuit 335; and the multiply arithmetic circuit 335 to the adder circuit 334. The adder circuit 334 is connected to the pixel pipelines 6.

The SRAM module 336 of the embodiment 3(b) receives and stores a super sampling pattern and an interlacing pattern as sized in agreement with the reduction ratio of the super sampling from the set-up unit 3 for each stamp. The patterns ΔY, ΔYs and ΔXs are then transferred to the multiply arithmetic circuit 311 and the multiply arithmetic circuit 315.

The super sampling pattern and the interlacing pattern are then read out from the SRAM module 336 in accordance with the reduction ratio of the super sampling in the step S331.

The relative position of the representative point is calculated from the interlacing pattern by means of the DDAX 332 in the step S332. The relative position calculated in this case is the relative position of the next scanning line relative to the representative point of the current scanning line having been. The calculation of the relative position is performed when a region judgement unit (not shown in the figure) judges that the draw stamp has reached the boundary line of the polygon.

The respective parameters of the representative point are calculated by the DDA color unit 333 in the step S333.

The set of patterns for sparse sampling as stored in the pattern table 337 is switched by the use of the vertical synchronization signal in the step S334.

A pattern for sparse sampling is read out from the SRAM module 338 in the step S335.

The respective parameters of the sample points in the stamp are calculated by means of the multiply arithmetic circuit 335 and the adder circuit 334 in the step S336 and are allocated to the respective pixel pipelines 6.

Figure 37:
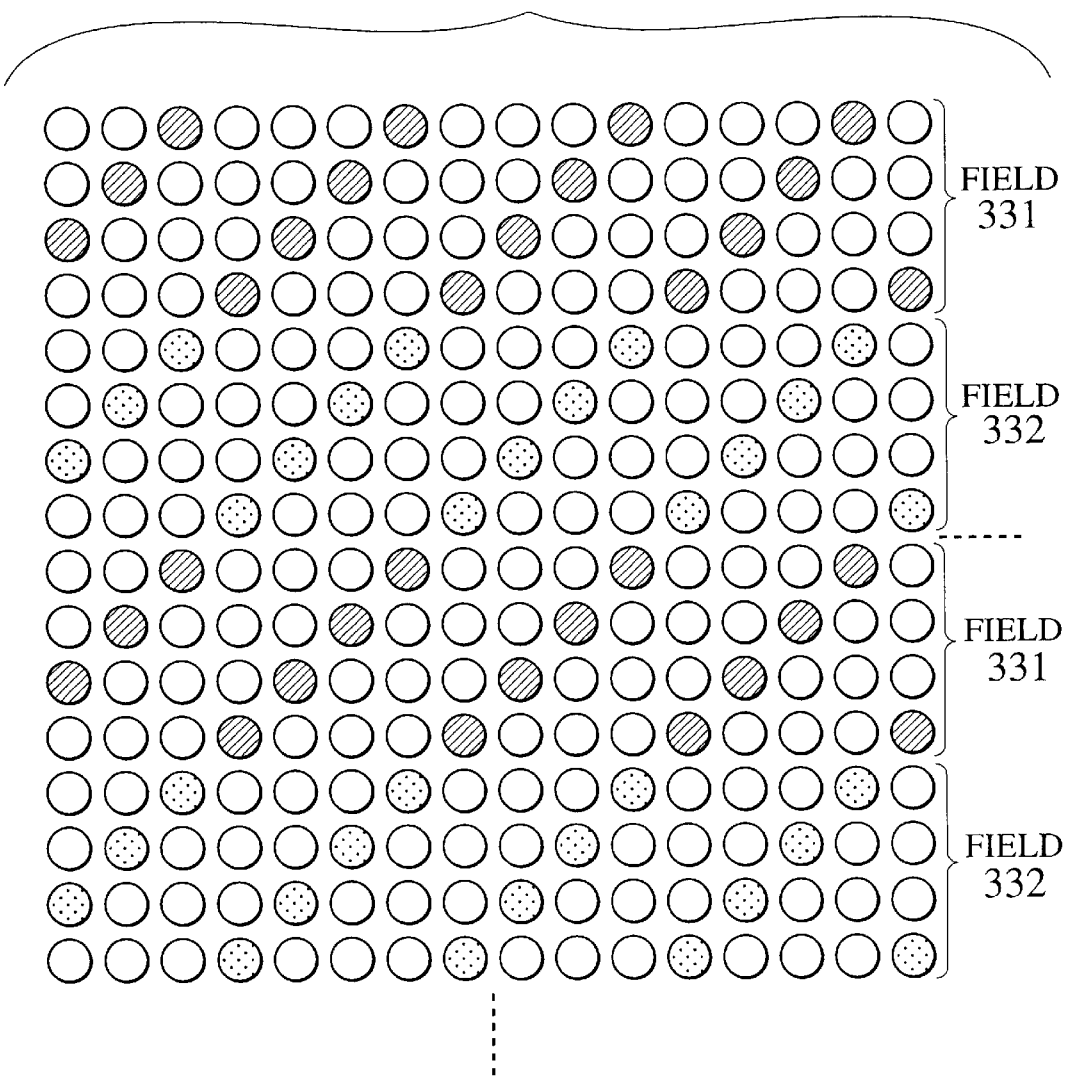
FIG. 37 is a schematic diagram showing one example of the drawing plane as obtained in accordance with the embodiment 3(c).

Exemplary drawing planes as obtained are illustrated in FIG. 35 and FIG. 37. For example, the drawing plane as illustrated in FIG. 35 is obtained for displaying an image on an odd frame while the drawing plane as illustrated in FIG. 37 is obtained for displaying an image on an even frame.

A) In the case where N>P (i.e., the size of the stamp is greater than the size of sparse sampling), the pixels as drawn are as illustrated in FIG. 35(b) so that actual rendering of images is performed to generate pixels drawn with a vertical interval of P lines skipped. Stored in the SRAM module 336 is data required for drawing the pixels on every other P lines within one stamp.

B) In the case where N<=P (i.e., the size of the stamp is not greater than the size of sparse sampling), the pixels as drawn are as illustrated in FIG. 35(c).

P×P super sampling is performed by repeating the process of drawing P/N scanning lines followed by an increment of 2×P lines for the subsequent drawing of the next P/N scanning lines. Stored in the SRAM module 336 is data required for drawing in this manner.

In accordance with the system of the present embodiment, it is possible to halve the number of the pixels to be drawn on one field and reduce the hardware costs. Furthermore, it is possible to increase the number of levels of halftone images with the same capacity of the graphics memory and the same amount of computation as required of a conventional technique and to render graphics data to generate a higher quality of images, as compared with the case in accordance with the embodiment 3(a), by switching the sparse sampling pattern as fetched from the pattern table 337 for the respective frames.

<Embodiment 3(d)>

Figure 21:
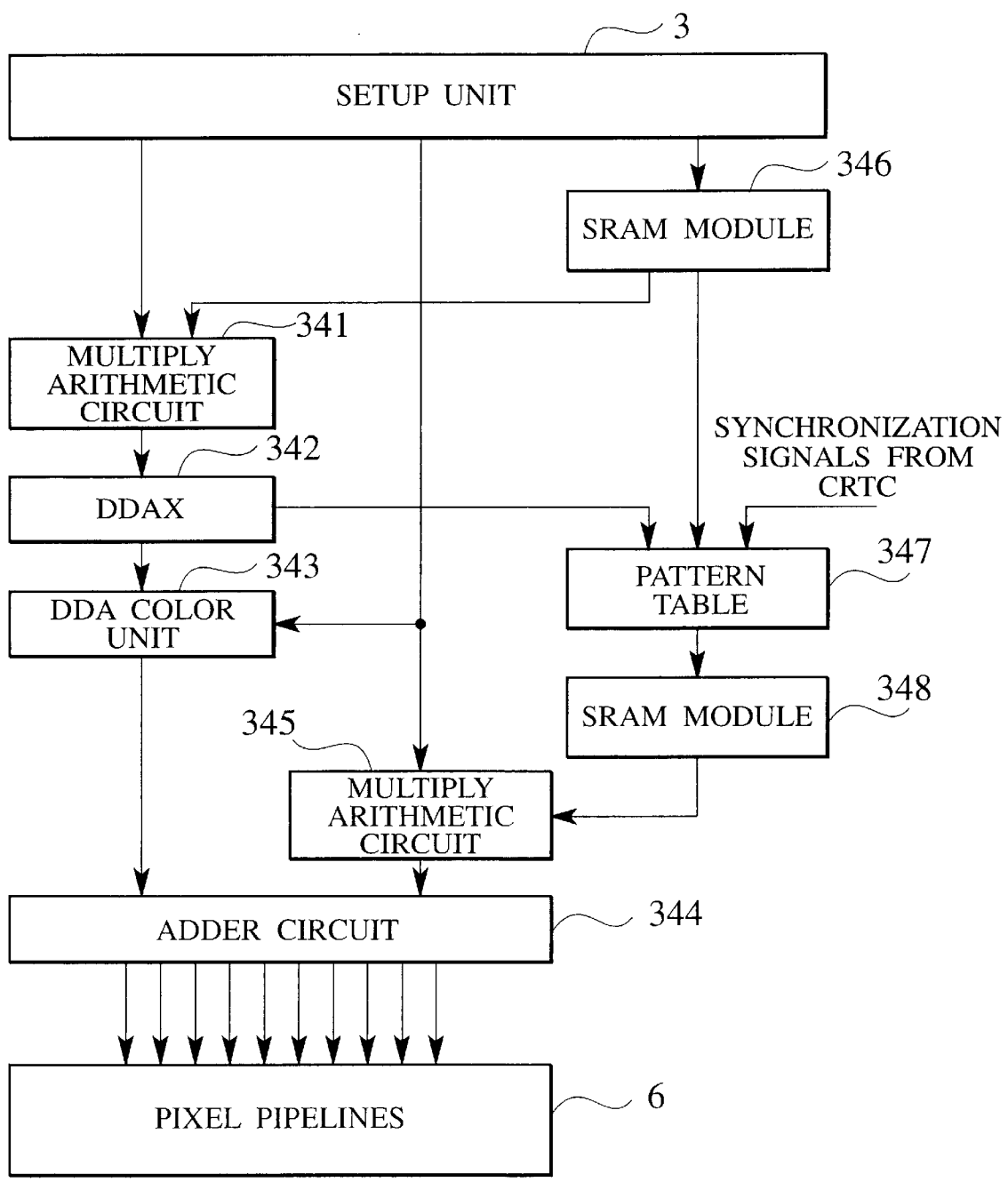
FIG. 21 is a block diagram showing the configuration from the set-up unit 3 to the pixel pipelines 6 in accordance with the embodiment 3(d).
Figure 22:
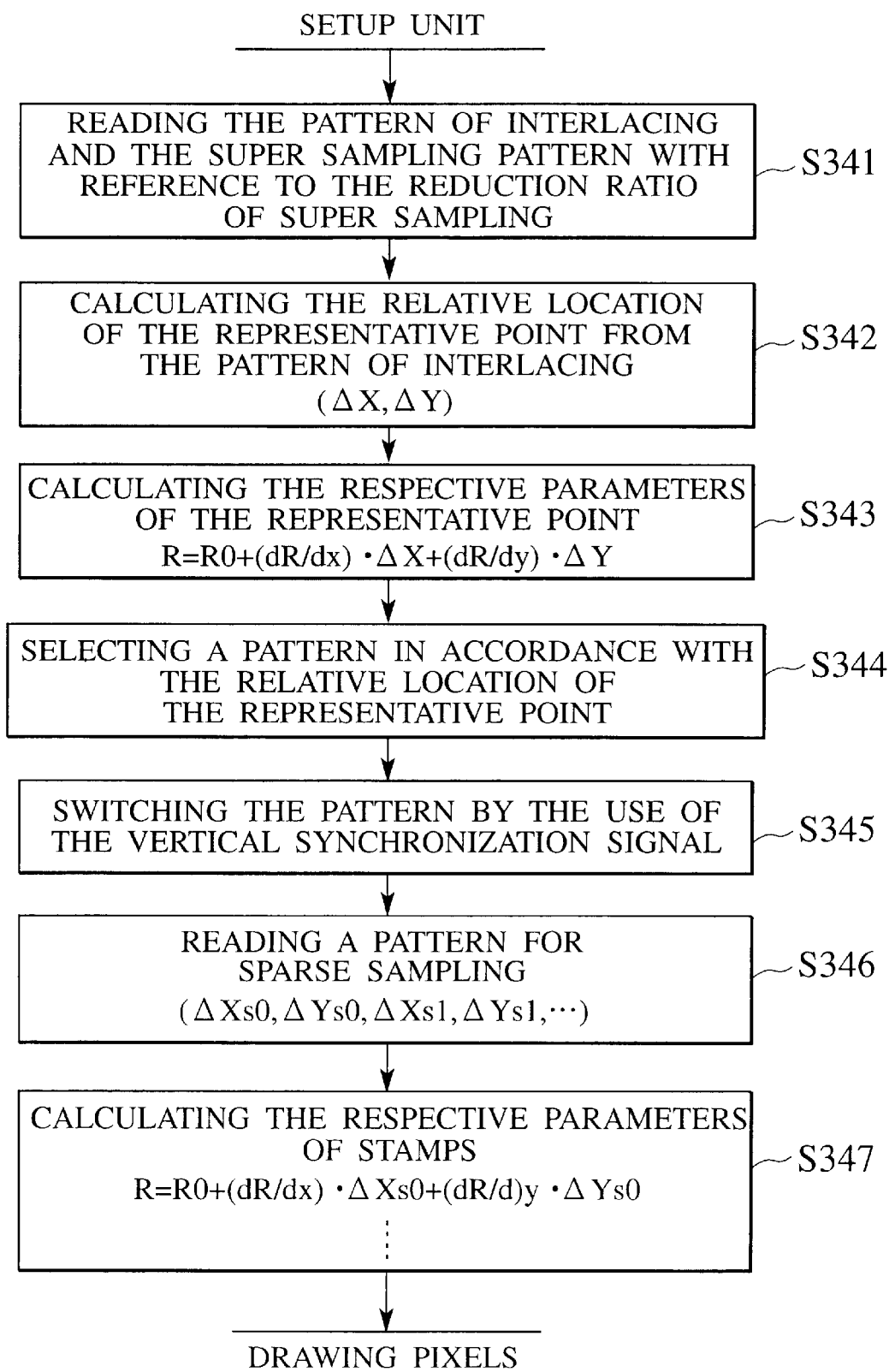
FIG. 22 is a flowchart showing the procedure from the set-up unit 3 to the pixel pipelines 6 in accordance with the embodiment 3(d).

FIG. 21 is a block diagram showing the configuration from the set-up unit 3 to the pixel pipelines 6. FIG. 22 is a flowchart showing the procedure for the respective blocks as illustrated in FIG. 21.

The set-up unit 3 functions as a polygon parameter calculating unit; a DDAX 342 as a representative point position calculating unit; a DDA color unit 343 as a representative point parameter calculating unit; an SRAM module 346 as a y-direction increment storing unit; an SRAM module 348 as a sampling pattern storing unit; a multiply arithmetic circuit 345 and the adder circuit 344 as a sample point parameter calculating unit; and the pattern table 347 as a sampling pattern selecting unit.

The set-up unit 3 is connected to the multiply arithmetic circuit 341, the DDA color unit 343, the multiply arithmetic circuit 341 and the SRAM module 346. The multiply arithmetic circuit 341 is connected to the DDAX 342; the DDAX 342 is connected to the DDA color unit 343 and the pattern table 347; and the DDA color unit 343 to the adder circuit 344; The SRAM module 346 is connected to the pattern table 347; the pattern table 347 to the SRAM module 348; the SRAM module 348 to the multiply arithmetic circuit 345; and the multiply arithmetic circuit 345 to the adder circuit 344. The adder circuit 344 is connected to the pixel pipelines 6.

The SRAM module 346 of the embodiment 3(d) receives and stores a super sampling pattern and an interlacing pattern as sized in agreement with the reduction ratio of the super sampling from the set-up unit 3 for each stamp. The patterns ΔY, ΔYs and ΔXs are then transferred to the multiply arithmetic circuit 311 and the multiply arithmetic circuit 315.

The super sampling pattern and the interlacing pattern are then read out from the SRAM module 346 in accordance with the reduction ratio of the super sampling in the step S331.

The relative position of the representative point is calculated from the interlacing pattern by means of the DDAX 342 in the step S332. The relative position calculated in this case is the relative position of the next scanning line relative to the representative point of the current scanning line having been. The calculation of the relative position is performed when a region judgement unit (not shown in the figure) judges that the scanning point of the current scanning line has reached the boundary line of the polygon.

The respective parameters of the representative point are calculated by the DDA color unit 343 in the step S333.

The pattern for sparse sampling is switched in the step S344 in accordance with the relative position of the representative point which is obtained by the use of the DDAX 342 in the step S342.

The set of patterns for sparse sampling as stored in the pattern table 347 is switched by the use of the vertical synchronization signal in the step S334.

A pattern for sparse sampling is read out from the SRAM module 348 in the step S335.

The respective parameters of the sample points in the stamp are calculated by means of the multiply arithmetic circuit 345 and the adder circuit 344 in the step S336 and are allocated to the respective pixel pipelines 6.

Figure 38:
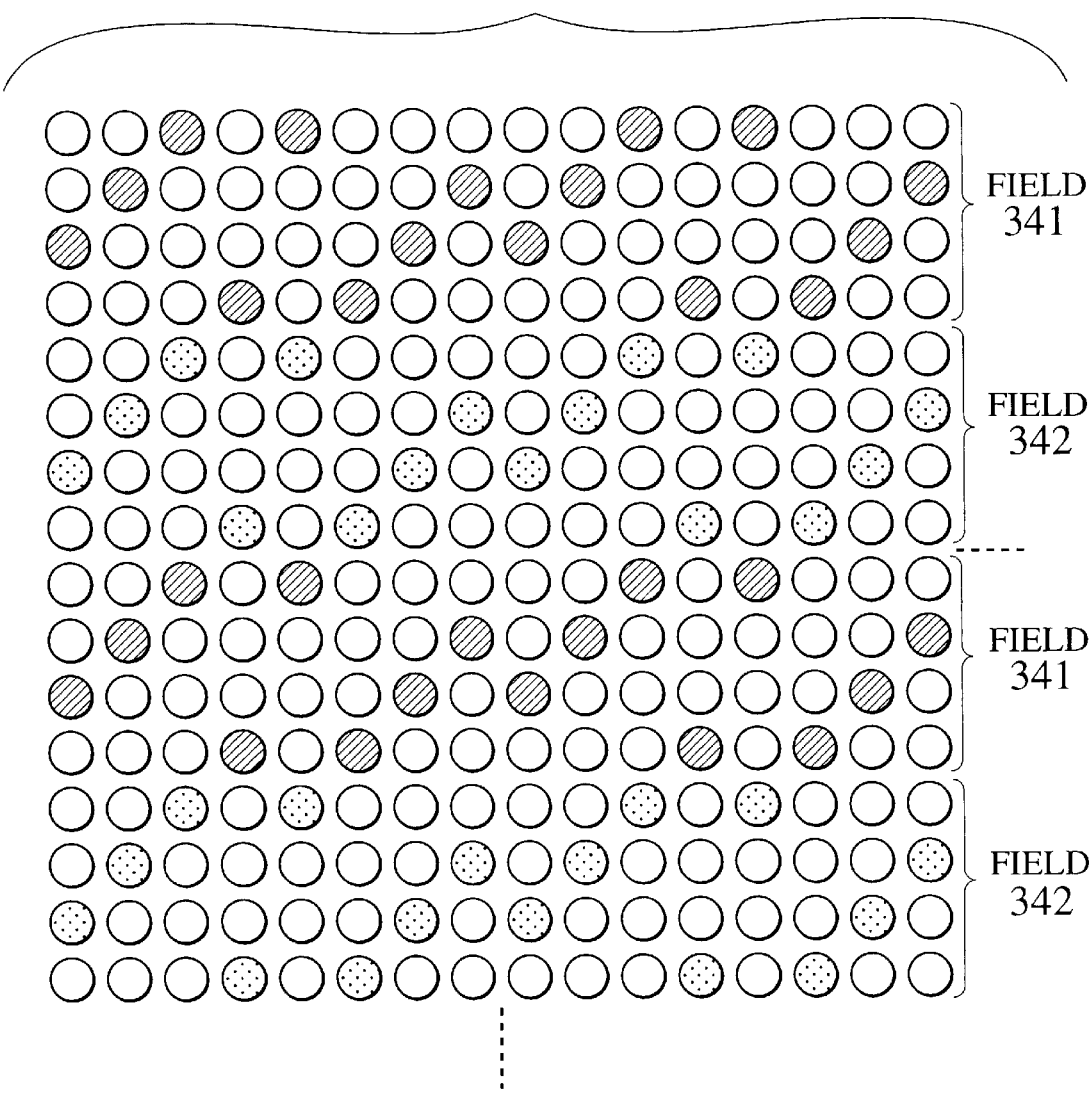
FIG. 38 is a schematic diagram showing one example of the drawing plane as obtained in accordance with the embodiment 3(d).

Exemplary drawing planes as obtained are illustrated in FIG. 36 and FIG. 38. For example, the drawing plane as illustrated in FIG. 36 is obtained for displaying an image on an odd frame while the drawing plane as illustrated in FIG. 38 is obtained for displaying an image on an even frame.

A) In the case where N>P (i.e., the size of the stamp is greater than the size of sparse sampling), the pixels as drawn are as illustrated in FIG. 35(b) so that actual rendering of images is performed to generate pixels drawn with a vertical interval of P lines skipped. Stored in the SRAM module 346 is data required for drawing the pixels on every other P lines within one stamp.

B) In the case where N<=P (i.e., the size of the stamp is not greater than the size of sparse sampling), the pixels as drawn are as illustrated in FIG. 35(c).

P×P super sampling is performed by repeating the process of drawing P/N scanning lines followed by an increment of 2×P lines for the subsequent drawing of the next P/N scanning lines. Stored in the SRAM module 346 is data required for drawing in this manner.

In accordance with the system of the present embodiment, it is possible to halve the number of the pixels to be drawn on one field and reduce the hardware costs. Furthermore, it is possible to increase the number of levels of halftone images with the same capacity of the graphics memory and the same amount of computation as required of a conventional technique and to render graphics data to generate a higher quality of images, as compared with the cases in accordance with the embodiment 3(a), the embodiment 3(b) and the embodiment 3(c), by switching the sparse sampling pattern as fetched from the pattern table 347 for the respective frames.

While the sampling pattern storing unit and the y-direction increment storing unit are implemented with SRAMs in accordance with the above-described embodiments, any other storage devices such as DRAMs can be used for the same purpose.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer graphics rendering system for drawing a plurality of pixels in parallel, comprising:

a polygon parameter calculating unit configured to calculate a P0, a dP/dx and a dP/dy, wherein P0 is a parameter value of an apex of a polygon, dP/dx is a gradient of the parameter value in an x-direction in the polygon, and dP/dy is a gradient of the parameter value in a y-direction in the polygon;

a representative point position calculating unit configured to calculate a $\Delta X$ and a $\Delta Y$, wherein $\Delta X$ is an x-coordinate of a representative point in a stamp in the polygon with respect to the apex of the polygon, and $\Delta Y$ is a y-coordinate of the representative point with respect to the apex;

a representative point parameter calculating unit configured to receive the P0, the dP/dx and the dP/dy from the polygon parameter calculating unit, to receive the $\Delta X$ and the $\Delta Y$ from the representative point position calculating unit, and to calculate a parameter value of the representative point Pr, wherein $$Pr=P0+(dP/dx)\times\Delta X+(dP/dy)\times\Delta Y;$$

a sampling pattern storing unit configured to store a set of a natural number N and a natural number M, wherein $$N=(\Delta X_{sample})/(\Delta X_{subpixel}),$$

$$M=(\Delta Y_{sample})/(\Delta Y_{subpixel}),$$

$\Delta X_{sample}$ is an x-coordinate of a sample point in the stamp with respect to the representative point, $\Delta X_{subpixel}$ is a fixed value and a distance between each adjacent subpixels in the x-direction, $\Delta Y_{sample}$ is a y-coordinate of the sample point with respect to the representative point, and $\Delta Y_{subpixel}$ is a fixed value and a distance between each adjacent subpixels in the y-direction; and a sample point parameter calculating unit configured to calculate a parameter value of the sample point $P_{sample}$, wherein $$P_{sample}=N\times(dP/dx)\times(\Delta X_{subpixel})+M\times(dP/dy)\times(\Delta Y_{subpixel})\times Pr.$$

2. The rendering system of claim 1, further comprising:
a sampling pattern selecting unit configured to receive at least one of $\Delta X$ and $\Delta Y$ from the representative point position calculating unit, and to select one of a first and a second sampling pattern in accordance with the at least one of $\Delta X$ and $\Delta Y$.

3. The rendering system of claim 1, further comprising:
a sampling pattern selecting unit configured to receive a frame number from a display device controller controlling a pixel display device, and select one of a first and a second sampling pattern in accordance with the frame number.

4. The rendering system of claim 2, wherein the sampling pattern selecting unit is configured to receive a frame number from a display device controller controlling a pixel display device, and to select one of the first and the second sampling patterns in accordance with the at least one of ΔX and ΔY and the frame number.

5. The rendering system of claim 1, further comprising:
a region judgment unit configured to whether a first scanning line has been completely drawn when a position of the stamp having been drawn has reached a boundary line of the polygon; and
a y-direction increment storing unit configured to store a y-direction increment corresponding to the distance between a first representative point of the first scanning line and a second representative point of a second scanning line to be drawn anew, wherein
the representative point position calculating unit is configured to receive the y-direction increment from the y-direction increment storing unit to obtain a relative position of the second representative point with respect to the apex of the polygon.

6. A computer graphics rendering system for drawing a plurality of pixels in parallel, comprising:
calculating a P0, a dP/dx and a dP/dy, where P0 is a parameter value of an apex of a polygon, dP/dx is a gradient of the parameter value in an x-direction in the polygon, and dP/dy is a gradient of the parameter value in a y-direction in the polygon;
calculating a ΔX and a ΔY, wherein
ΔX is an x-coordinate of a representative point in a stamp in the polygon with respect to the apex of the polygon, and
ΔY is a y-coordinate of the representative point with respect to the apex; calculating a parameter value of the representative point Pr, wherein $$Pr = P0 + (dP/dx) \times \Delta X + (dP/dy) \times \Delta Y;$$

storing a natural number N and a natural number M, wherein $$N = (\Delta X_{sample})/(\Delta X_{subpixel}),$$
$$M = (\Delta Y_{sample})/(\Delta Y_{subpixel}),$$

$\Delta X_{sample}$ is an x-coordinate of a sample point in the stamp with respect to the representative point,
$\Delta X_{subpixel}$ is a fixed value and a distance between each adjacent subpixels in the x-direction,
$\Delta Y_{sample}$ is a y-coordinate of the sample point with respect to the representative point, and
$\Delta Y_{subpixel}$ is a fixed value and a distance between each adjacent subpixels in the y-direction; and
calculating a parameter value of the sample point $P_{sample}$, wherein $$P_{sample} = N \times (dP/dx) \times (\Delta X_{subpixel}) + M \times (dP/dy) \times (\Delta Y_{subpixel}) \times Pr.$$

7. The computer graphics rendering method of claim 6, further comprising:
selecting one of a first and a second sampling patterns in accordance with the at least one of ΔX and ΔY.

8. The computer graphics rendering method of claim 6, further comprising:
receiving a frame number; and
selecting one of a first and a second sampling patterns in accordance with the frame number.

9. The computer graphics rendering method of claim 6, further comprising:

receiving a frame number; and
selecting one of the first and the second sampling patterns in accordance with the at least one of ΔX and ΔY, and the frame number.

10. The computer graphics rendering method of claim 6, further comprising:
determining whether a scanning line has been completely drawn when a position of the stamp having been drawn has reached a boundary line of the polygon;
storing a y-direction increment corresponding to the distance between a first representative point of a first scanning line having been completely drawn and a second representative point of a second scanning line to be drawn anew; and
obtaining a relative position of the second representative point with respect to the apex of the polygon.

11. A computer graphics rendering program product for drawing a plurality of pixels in parallel, comprising:
instructions configured to calculate a P0, a dP/dx and a dP/dy, where P0 is a parameter value of an apex of a polygon, dP/dx is a gradient of the parameter value in an x-direction in the polygon, and dP/dy is a gradient of the parameter value in a y-direction in the polygon;
instructions configured to calculate a ΔX and a ΔY wherein
ΔX is an x-coordinate of a representative point in a stamp in the polygon with respect to the apex, and
ΔY is a y-coordinate of the representative point with respect to the apex;
instructions configured to calculate a parameter value of the representative point Pr, and $Pr = P0 + (dP/dx) \times \Delta X + (dP/dy) \times \Delta Y$;
instructions configured to store a natural number N and a natural number M, wherein $$N = (\Delta X_{sample})/(\Delta X_{subpixel}),$$
$$M = (\Delta Y_{sample})/(\Delta Y_{subpixel}),$$

$\Delta X_{sample}$ is an x-coordinate of a sample point in the stamp with respect to the representative point,
$\Delta X_{subpixel}$ is a fixed value and a distance between each adjacent subpixels in the x-direction,
$\Delta Y_{sample}$ is a y-coordinate of a sample point with respect to the representative point, and
$\Delta Y_{subpixel}$ is a fixed value and a distance between each adjacent subpixels in the y-direction; and
instructions configured to calculate a $P_{sample}$, wherein
$P_{sample}$ is the parameter value of the sample point, and $$P_{sample} = N \times (dP/dx) \times (\Delta X_{subpixel}) + M \times (dP/dy) \times (\Delta Y_{subpixel}) \times Pr.$$

12. The computer graphics rendering program product of claim 11, further comprising:
instructions configured to store two or more sampling patterns; and
instructions configured to select one of the sampling patterns in accordance with at least one of ΔX and ΔY.

13. The computer graphics rendering program product of claim 11, further comprising:
instructions configured to store two or more sampling patterns;
instructions configured to receive a frame number from a display device controller configured to control a pixel display device configured to display pixels; and
instructions configured to select one of the sampling patterns in accordance with the frame number.

14. The computer graphics rendering program product of claim 11, further comprising:

instructions configured to receive a frame number from a display device controller configured to control a pixel display device configured to display pixels; and instructions configured to select one of the sampling patterns in accordance with at least one of $\Delta X$ and $\Delta Y$ and the frame number.

15. The computer graphics rendering program product of claim 11, further comprising:

instructions configured to judge that a scanning line has been completely drawn when a position of the stamp having been drawn has reached a boundary line of the polygon;

instructions configured to store a y-direction increment corresponding to the distance between a first representative point of a first scanning line having been completely drawn and a second representative point of a second scanning line to be drawn anew; and instructions configured to obtain a relative position of the second representative point with respect to the apex of the polygon.

\* \* \* \* \*